(12) United States Patent
Horri et al.

(10) Patent No.: US 8,411,091 B2
(45) Date of Patent: Apr. 2, 2013

(54) IMAGE DRAWING SYSTEM, IMAGE DRAWING SERVER, IMAGE DRAWING METHOD, AND COMPUTER PROGRAM

(75) Inventors: Hiroshi Horri, Yamato (JP); Kiyokuni Kawachiya, Yokohama (JP); Akira Koseki, Sagamihara (JP); Toshihiro Takahashi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 12/407,085

(22) Filed: Mar. 19, 2009

(65) Prior Publication Data

US 2009/0237403 A1 Sep. 24, 2009

(30) Foreign Application Priority Data

Mar. 21, 2008 (JP) .................................. 2008-73506

(51) Int. Cl.
- G06T 15/10 (2011.01)
- G06T 15/00 (2011.01)
- G09G 5/00 (2006.01)

(52) U.S. Cl. ......... 345/427; 345/419; 345/634; 345/649

(58) Field of Classification Search .................... None
See application file for complete search history.

(56) References Cited

U.S. PATENT DOCUMENTS

| | | | | |
|---|---|---|---|---|
| 6,452,598 | B1 * | 9/2002 | Rafey et al. | 345/473 |
| 6,633,317 | B2 * | 10/2003 | Li et al. | 715/854 |
| 6,760,026 | B2 * | 7/2004 | Li et al. | 345/427 |
| 2007/0011617 | A1 * | 1/2007 | Akagawa et al. | 715/738 |

FOREIGN PATENT DOCUMENTS

| | | |
|---|---|---|
| JP | 10021215 | 1/1998 |
| JP | 2001-283022 A | 10/2001 |
| JP | 2002140731 | 5/2002 |

(Continued)

OTHER PUBLICATIONS

Azzedine Boukerche and Richard W. Nelem Pazzi. 2006. Scheduling and buffering mechanisms for remote rendering streaming in virtual walkthrough class of applications. In Proceedings of the 2nd ACM international workshop on Wireless multimedia networking and performance modeling (WMuNeP '06). ACM, New York, NY, USA, 53-60.*

(Continued)

*Primary Examiner* — Kee M Tung
*Assistant Examiner* — Zhengxi Liu
(74) *Attorney, Agent, or Firm* — Cantor Colburn LLP; Gail Zarick

(57) ABSTRACT

An image drawing system, an image drawing server, an image drawing method, and a computer program product that provides a three-dimensional world to a client-terminal. The method includes: providing a viewpoint in the vicinity of an avatar and creating a three-dimensional object; performing a perspective projection of a static object to create a two-dimensional panoramic image; overlaying the two-dimensional panoramic image, information on a dynamic object, and an image of the avatar; and storing the two-dimensional panoramic image. The computer program product tangibly embodies instructions which when implemented causes a computer to execute the steps of the method. The system includes: a three-dimensional object creation unit; a panoramic image creation unit; a drawing unit for overlaying; and a panoramic image storage unit. The server includes: a reception unit; a three-dimensional object creation unit; a panoramic image creation unit; and a transmission unit.

16 Claims, 15 Drawing Sheets

FOREIGN PATENT DOCUMENTS

| | | |
|---|---|---|
| JP | 2003511782 | 3/2003 |
| JP | 2005-223430 A | 8/2005 |
| JP | 2005-250560 A | 9/2005 |

OTHER PUBLICATIONS

Ma et al. 2000. A framework for adaptive content delivery in heterogeneous network environments. Proc. SPIE vol. 3969, p. 86-100, Multimedia Computing and Networking.*

Jonathan Shade, Steven Gortler, Li-wei He, and Richard Szeliski. 1998. Layered depth images. In Proceedings of the 25th annual conference on Computer graphics and interactive techniques (SIGGRAPH '98). ACM, New York, NY, USA, 231-242.*

D. E. Breen, E. Rose, and R. T. Whitaker. Interactive occlusion and collision of real and virtual objects in augmented reality. Technical Report ECRC-95-02, European Computer-Industry Research Centre GmbH, Munich, Germany, 1995.*

Doug A. Bowman, Chris North, Jian Chen, Nicholas F. Polys, Pardha S. Pyla, and Umur Yilmaz. 2003. Information-rich virtual environments: theory, tools, and research agenda. In Proceedings of the ACM symposium on Virtual reality software and technology (VRST '03). ACM, New York, NY, USA, 81-90.*

Leonard McMillan and Gary Bishop. 1995. Plenoptic modeling: an image-based rendering system. In Proceedings of the 22nd annual conference on Computer graphics and interactive techniques (SIGGRAPH '95), Susan G. Mair and Robert Cook (Eds.). ACM, New York, NY, USA, 39-46.*

Shenchang Eric Chen. 1995. QuickTime VR: an image-based approach to virtual environment navigation. In Proceedings of the 22nd annual conference on Computer graphics and interactive techniques (SIGGRAPH '95), Susan G. Mair and Robert Cook (Eds.). ACM, New York, NY, USA, 29-38.*

Sing Bing Kang and Huong Quynh Dinh. 1999. Multi-layered image-based rendering. In Proceedings of the 1999 conference on Graphics interface '99. Morgan Kaufmann Publishers Inc., San Francisco, CA, USA, 98-106.*

Norris, B.E., D.Z. Rashid, and B.L. Wong. Wayfinding/Navigation within a QTVR Virtual Environment: Preliminary Results. In INTERACT '99, Seventh IFIP Conference on Human-Computer Interaction. 1999. Edinburgh, Scotland: IOS Press.*

QTVR Hotspots ( "QTVR Hotspots" http://creativemac.digitalmedianet.com/articles/viewarticle.jsp?id=24903. Archived on Sep. 22, 2007. Retrieved on Mar. 24, 2012 from <http://web.archive.org/web/20070922183922/http://creativemac.digitalmedianet.com/articles/viewarticle.jsp?id=24903>.*

L. Darsa, B. Costa, A. Varshney, Walkthroughs of complex environments using image-based simplification, Computers & Graphics, vol. 22, Issue 1, Feb. 25, 1998, pp. 55-69.*

Jeschke, S., Wimmer, M., & Schumann, H. (2002). Layered Environment-Map Impostors for Arbitrary Scenes. Graphics Interface (p. 1-8).*

* cited by examiner

IMAGE DRAWING SYSTEM, IMAGE DRAWING SERVER, IMAGE DRAWING METHOD, AND COMPUTER PROGRAM

CROSS-REFERENCE TO RELATED APPLICATIONS

This application claims priority under 35 U.S.C. §119 to Japanese Patent Application No. 2008-73506 filed Mar. 21, 2008, the entire contents of which are incorporated by reference herein.

BACKGROUND OF THE INVENTION

1. Field of the Invention

The present invention relates to an image drawing system, an image drawing server, an image drawing method, and a computer program for providing three-dimensional virtual world to at least one client terminal.

2. Description of the Related Art

In keeping with the trend of three-dimensional Internet and three-dimensional games, there is an increasing demand by users to access three-dimensional virtual world from a low-performance device such as a mobile phone. However, it is difficult to transmit a large amount of image information on the virtual world to a low-performance device such as a mobile phone because of problems with the communication time period and communication traffic resulting from a narrow bus width for data transfer of a low-performance device. Further, it is also difficult to render a large amount of transmitted image information on virtual world three-dimensionally because of the processing power of a low-performance device. Many methods have been proposed for enabling access to the virtual world from a low-performance device.

Japanese Unexamined Patent Publication (Kokai) No. H10 (1998)-021215 (Patent Document 1) discloses a method of three-dimensional space imitation drawing in perspective based on a two-dimensional still image. According to the method described in Patent Document 1, first, a client terminal shrinks a still image showing an object or the appearance of an avatar in accordance with the depth of the arrangement thereof on a two-dimensional still image in perspective showing the background of the space seen from the viewpoint of each avatar. Then, the client terminal overwrites the image on the background image in the order of decreasing depth and detects the collision of mutual positions of the avatar or the object to control the movement.

Japanese Unexamined Patent Publication (Kokai) No. 2002-140731 (Patent Document 2) discloses a method of realizing smooth image movement even without the use of three-dimensional images and a lot of two-dimensional still image data. According to the method of Patent Document 2, an image processor conducts zoom-out or zoom-in processing with respect to at least one sheet of two-dimensional still image data representing virtual world so as to appear three-dimensionally in perspective, centering around a predetermined point on the two-dimensional still image data, where such processing is performed gradually while changing a magnitude, and a result of the zoom processing performed gradually is displayed one by one on a display screen of a computer or the like.

Japanese Unexamined Patent Publication (Kokai) No. 2003-511782 (Patent Document 3) discloses a method of decreasing the number of hours required for downloading a webpage. According to the method of Patent Document 3, a web server displays elements of a web page, such as a moving image or video stream data, as just still images, thus decreasing a size of a graphic image element and decreasing time required for downloading.

According to the methods described in Patent Documents 1 and 2, because a two-dimensional still image of the background within a range viewable from the viewpoint of the avatar is used, the server has to create a new two-dimensional still image every time the avatar's viewing direction changes even when the viewpoint does not change, and the client terminal has to receive the new two-dimensional still image to process it. According to the methods in Patent Documents 1 and 2, the movement of an image can be implemented by zooming in or out on an object or an avatar in the virtual world without the need for the client terminal to receive data for representing the movement of the image from the server one by one. However, in Patent Document 1, the movable range of the avatar is narrow and limited. In the method of Patent Document 2, when the avatar moves, the server creates a new two-dimensional still image while setting the position after the movement as a viewpoint, and the client receives the new two-dimensional still image and sets it as a background image. Thus, when a two-dimensional still image is transmitted to the client terminal every time the avatar moves, generating the additional processing thereof. Because of these problems, when the client terminal is a low-performance device such as a mobile phone, the three-dimensional virtual world cannot be provided thereto.

In view of the above-stated problems, it is an object of the present invention to provide an image drawing system, an image drawing server, an image drawing method, and a computer program that provides three-dimensional world to a client-terminal as a low-performance device.

SUMMARY OF THE INVENTION

In one aspect, the present invention provides an image drawing server that is connected to a client terminal via a network and constructs a three-dimensional virtual world. The image drawing server includes a reception unit, a three-dimensional object creation unit, a panoramic image creation unit, and a transmission unit. The reception unit acquires, from the client terminal, a position of an avatar of a user of the client terminal in a virtual world. The three-dimensional object creation unit provides a viewpoint in the vicinity of the avatar and creates a three-dimensional object having a plurality of substantially horizontal concentric polygons or concentric circles as a cross section thereof and the plurality of concentric polygons or concentric circles are centered around the viewpoint. The panoramic image creation unit performs a perspective projection of a static object in the three-dimensional virtual world residing in a plurality of regions obtained by dividing the three-dimensional object by borders thereof. The perspective projection performed for each region with respect to an outer side face of the region, while centering around the viewpoint, creates a plurality of two-dimensional panoramic images. The transmission unit transmits, to the client terminal, the plurality of two-dimensional panoramic images and information on a dynamic object residing in a region of any one of the outer object created by the three-dimensional object creation unit.

The "three-dimensional object having a plurality of substantially horizontal concentric polygons or concentric circles as a cross section thereof" referred to herein is a three-dimensional object in which polygonal pillars or cylinders are nested, where the polygonal pillars or the cylinders being tubular space figures have substantially congruent two plane figures. For example, it can be a three-dimensional polyhedron object surrounded by a plurality of (four or more) planes or a sphere that is a set of points residing at an equal distance from a fixed point or the polygonal pillars or cylinders. The "static object in the virtual world" referred to herein is a fixed object that resides in the virtual world and cannot move—for example, a building or a tree. The "dynamic object" referred to herein is an object that resides in the virtual world and can move—for example, an avatar and a dog. The "perspective projection" referred to herein is a technique of drawing a three-dimensional object on a two-dimensional plane as it appears, and more specifically, visual lines from the viewpoint toward a target are extended and a projection drawing of the target is drawn at the intersections of the extended visual lines with the screen.

In this aspect of the present invention, a two-dimensional panoramic image (hereinafter called a panoramic image) around 360 degrees surrounding the avatar is created, whereby when the viewing angle of the avatar changes, there is no need for the client terminal to receive a panoramic image newly created by the image drawing server so that the number of data communication times can be reduced. Further, the panoramic image is created based on each of the three-dimensional objects in the nest configuration dividing the virtual world, where the created panoramic images are hierarchized in accordance with the distances from the viewpoint. Because the panoramic images are hierarchized, a panoramic image away from the avatar does not change much when the avatar moves, and therefore such a panoramic image can be reused without redrawing it. Thus, the communication load and the processing speed by the client terminal can be reduced.

In another aspect of the present invention, the panoramic image creation unit adds a Z value to a panoramic image residing in a region of the three-dimensional object within the closest vicinity from the viewpoint to which the static object is projected, the Z value representing a position of the static object in a depth direction thereof. The Z value representing a position in the depth direction allows the panoramic image creation unit to view the panoramic image stereoscopically, thus realizing the virtual world.

In still another aspect of the present invention, when the avatar moves closer to a side face of a closest vicinity three-dimensional object from the viewpoint, the three-dimensional object creation unit first creates a new closest vicinity three-dimensional object while setting a position in the vicinity of the avatar as a new viewpoint in response to a request from the client terminal. Then, the panoramic image creation unit creates new two-dimensional panoramic images corresponding to the newly created closest vicinity three-dimensional object and a second closest vicinity three-dimensional object, where the second closest vicinity three-dimensional object is second closest to the viewpoint and has been already created. Thus, when the avatar moves, the three-dimensional object creation unit recreates panoramic images based on the closest vicinity three-dimensional object and a second closest vicinity three-dimensional object only, and other panoramic images can be reused, so that the communication load and the processing speed by the client terminals can be reduced. The closest vicinity three-dimensional object and the panoramic images can be created beforehand speculatively by making predictions on a new vicinity center position based on the current movement of the avatar.

In another aspect of the present invention, when the perspective projection of the static object in the virtual world is performed, the panoramic image creation unit associates action information accompanied by this object with a projection range of the object, and transmits the information together with the panoramic image to the client. Here, the action information refers to information relating to a function that the static object has. For example, this information includes how to open a door concerning a door open/close function of a building such as to open outwardly, or how to make a payment for a vending machine payment function. The client terminal displays the action information accompanied by the object when a pointer of the user enters the projection range, so as to make the user select an action, thus enabling interaction with the static object. When the user selects the action, the client terminal communicates with the server so as to call the action accompanied by the object.

As further aspects, the present invention can be provided as an image drawing server, an image drawing system, an image drawing server, an image drawing method, or a computer program executed by a computer such as a client-terminal, or specifically as a low-performance device.

DETAILED DESCRIPTION OF THE PREFERRED EMBODIMENTS

The following describes embodiments of the present invention with reference to the drawings.

Figure 1:
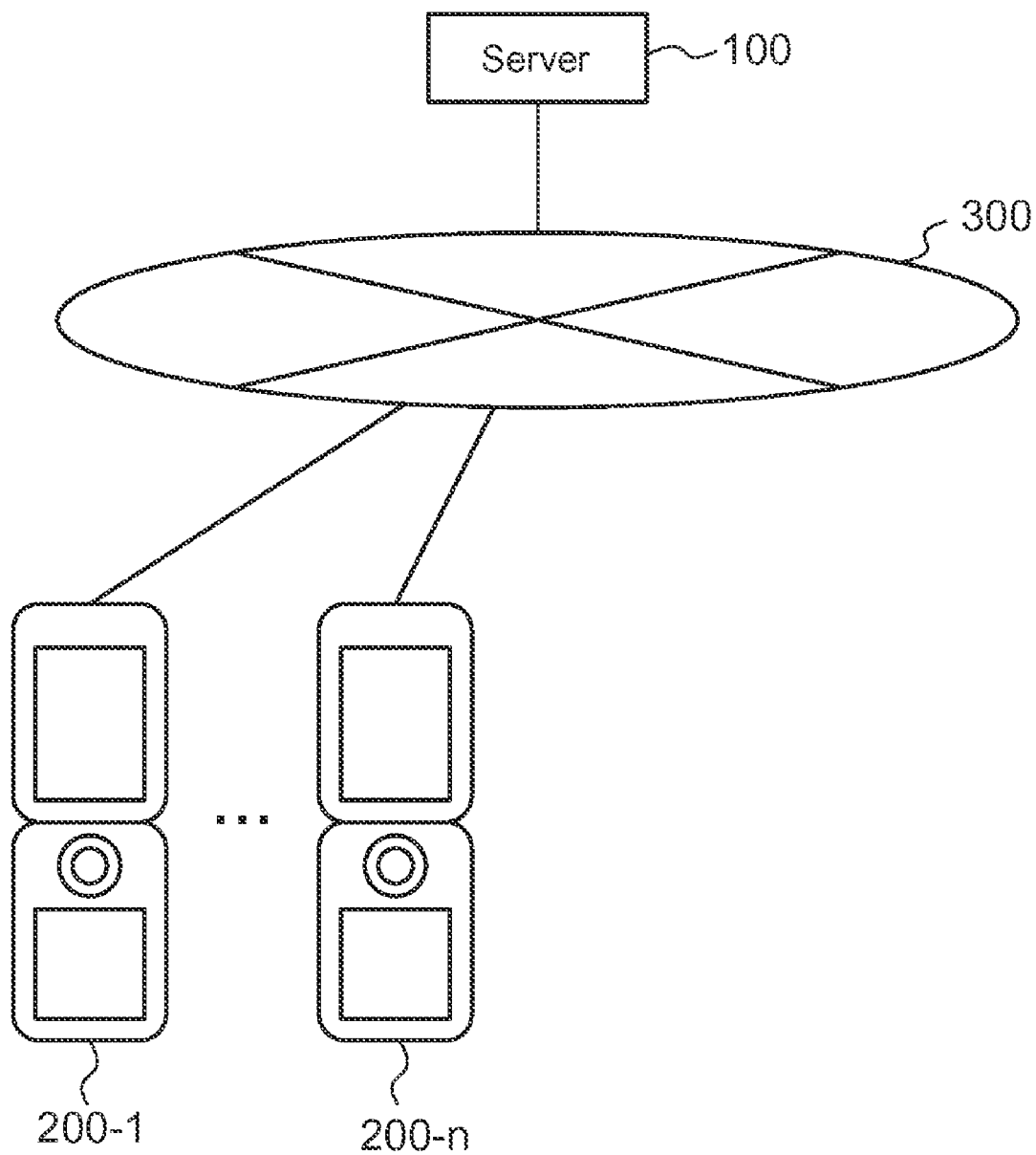
FIG. 1 illustrates the configuration of one embodiment of an image drawing system to which the present invention is applied.

FIG. 1 illustrates the configuration of one embodiment of an image drawing system 1 to which the present invention is applied. Mobile phones 200-1, 200-2, . . . 200-n (hereinafter simply referred to as mobile phones 200 if there is no need to distinguish between the mobile phones 200-1 to 200-*n*) are client terminals. The mobile phones 200 are connected to a network 300, typically, the Internet or an intranet, thus enabling transmission and reception of data with respect to an image drawing server 100. Information on the user's operation using a mobile phone 200 is transmitted to the server via the network 300, whereas the mobile phones 200 can receive information held in the image drawing server 100 via the network 300. Although the client terminals are the mobile phones 200 in this example, they can be computers or low-performance devices other than the mobile phones 200. The number of the image drawing servers 100 in this configuration is not limited to one. Rather, a plurality of servers can be included.

Figure 2:
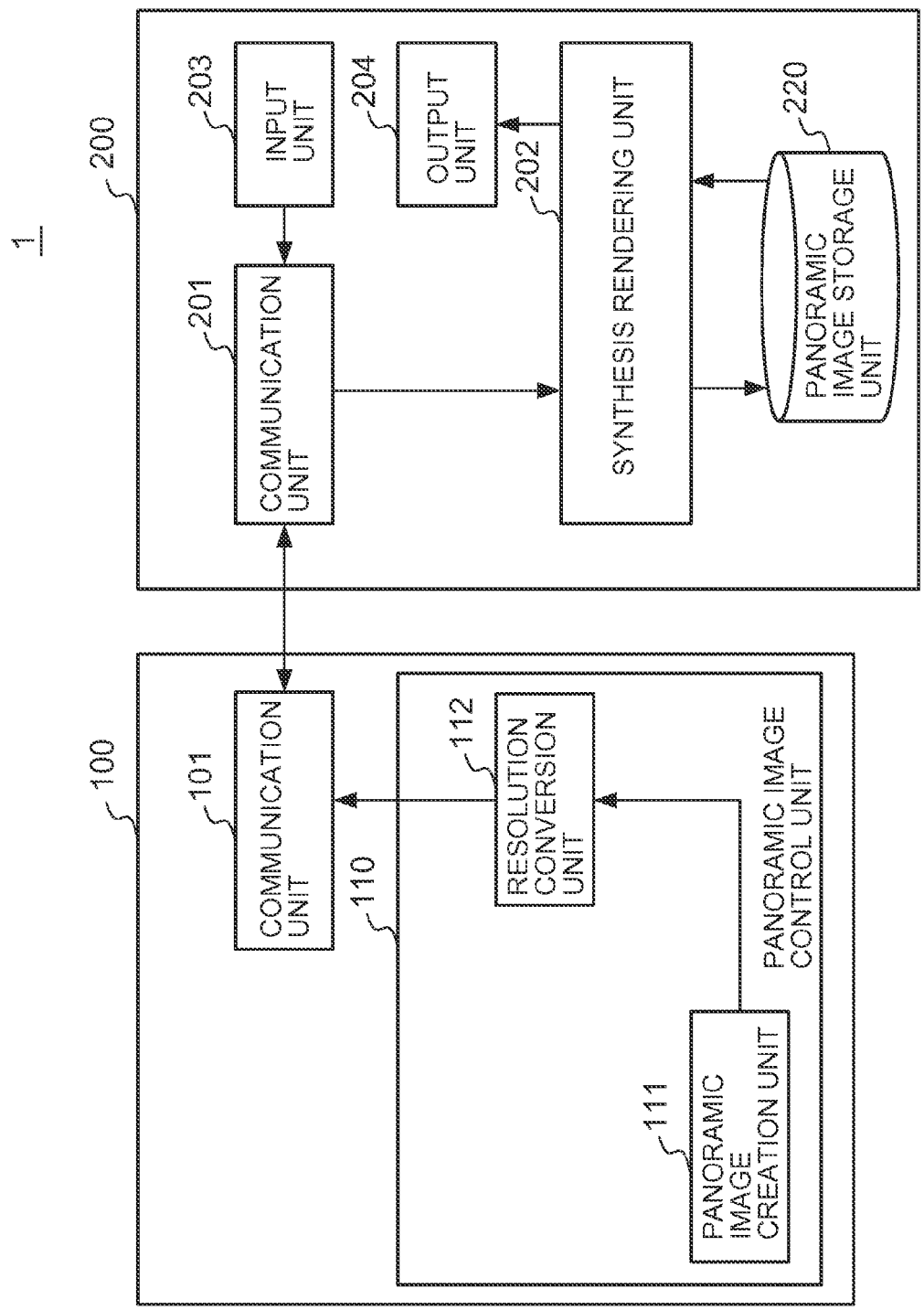
FIG. 2 illustrates a basic system configuration of a mobile phone and an image drawing server in an image drawing system in one embodiment.

FIG. 2 illustrates a basic system configuration of a mobile phone 200 and the image drawing server 100 in the image drawing system 1 of one embodiment. The image drawing server 100 includes a communication unit 101 and a panoramic image control unit 110. The panoramic image control unit 110 includes a panoramic image creation unit 111 and a resolution conversion unit 112. The mobile phone 200 includes a communication unit 201, a synthesis rendering unit 202, an input unit 203, an output unit 204, and a panoramic image storage unit 220.

The following describes each functional unit of the image drawing server 100 and the mobile phone 200. The communication units 101 and 201 transmit and receive information required for displaying a virtual world in the mobile phone 200. More specifically, the information includes a panoramic image created by the image drawing server 100 and movement information on an avatar that the user of the mobile phone 200 manipulates (hereinafter called an own avatar). The panoramic image creation unit 111 creates a panoramic image over 360 degrees that the own avatar of the mobile phone 200 sees while setting the position of the own avatar as the center. The resolution conversion unit 112 converts a resolution of the image created by the panoramic image creation unit 111 into a resolution matching with a display image of the mobile phone 200.

The synthesis rendering unit 202 edits information required for displaying the virtual world in the mobile phone 200 that is transmitted from the communication unit 101 of the image drawing server 100. More specifically, the synthesis rendering unit 202 synthesizes information on the panoramic image created by the image drawing server 100 and an avatar that a user of another mobile phone 200-*n* manipulates (hereinafter called another avatar), for example, to create an image to be displayed on a screen of the mobile phone 200. The output unit 204 outputs the image created by the synthesis rendering unit 202, which is a liquid crystal display (LCD), for example. The input unit 203 is used when the user manipulates its avatar, which is a keypad that includes numeric keys, a cross key, special keys and the like. The panoramic image storage unit 220 stores the panoramic image transmitted from the communication unit 101 of the image drawing server 100 that is required for displaying virtual world in the mobile phone 200.

The communication units 101 and 201 are the exemplary reception unit and the transmission unit, respectively. The panoramic image creation unit 111 is an exemplary three-dimensional object creation unit. The synthesis rendering unit 202 is an exemplary drawing unit. The panoramic image storage unit 220 is not limited to a database in a hard disk, but can be an external storage device such as a memory. The hardware configuration of the image drawing server 100 and the mobile phone 200 will be described later.

Figure 3:
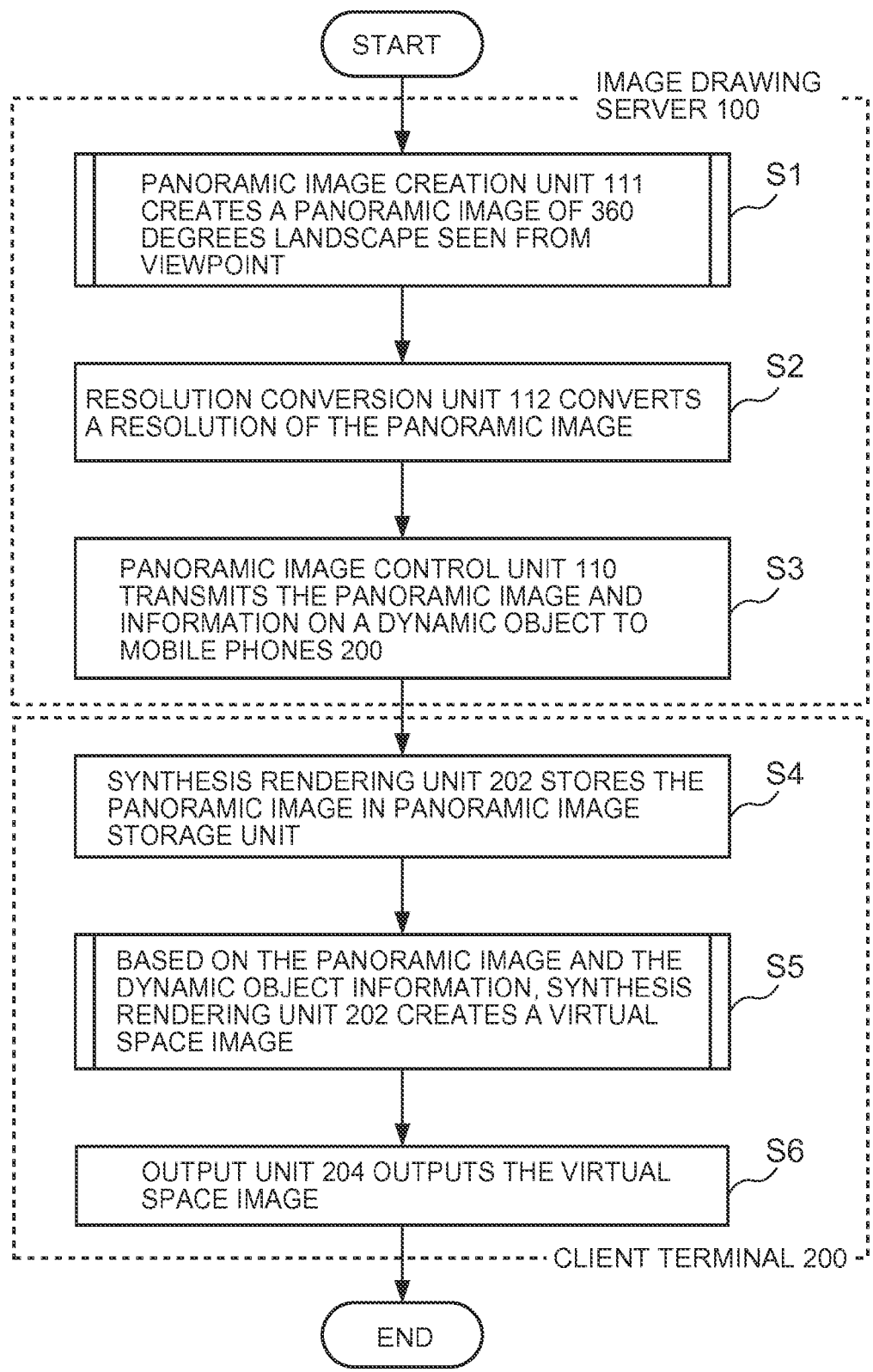
FIG. 3 is a flowchart of image drawing processing.
Figure 4:
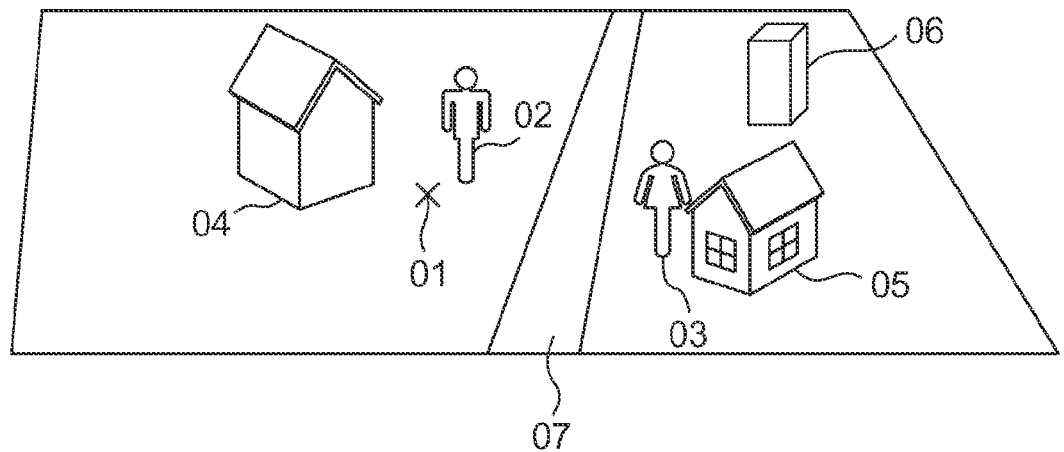
FIG. 4 illustrates an exemplary virtual world.

FIG. 3 is a flowchart of image drawing processing by the image drawing server 100 and on the client terminal 200. FIG. 4 illustrates an exemplary virtual world, with reference to FIGS. 3 to 15, which will be described below. The virtual world of FIG. 4 is made up of static objects including a building 04, a building 05, a building 06, and a road 07, and dynamic objects including an own avatar 02 that a user of the mobile phone 200 manipulates and another avatar 03 that a user of another client terminal manipulates. A viewpoint 01 is used for creating a panoramic image and it will be described later.

When a user logs into a virtual world or when the own avatar 02 moves, the mobile phone 200 sends information thereon, thus initiating the image drawing processing. At Step S1, the panoramic image creation unit 111 creates a panoramic image of 360 degrees landscape seen from the viewpoint 01. A plurality of such panoramic images is created, including for example, close views and distant views. Because a conventional plane panoramic image is a landscape in a field viewable from the viewpoint 01, the viewing angle of a user is narrow, thus failing to give realism to the user. The present invention can address such a problem by creating a panoramic image from the landscape over 360 degrees instead of the landscape in a field viewable from the viewpoint 01. Herein, the viewpoint 01 is located at a somewhat distant position from the position of the own avatar 02. This is because the viewpoint 01 set at the position of the own avatar 02 makes it impossible to draw the own avatar 02 in the panoramic image.

The panoramic image based on the 360-degree landscape is prepared by creating a virtual cylinder (hereinafter called cylinder) centering around the viewpoint 01 in the virtual world and rendering static objects residing in the cylinder on a side face of the cylinder, i.e., the side face of the cylinder provides the panoramic image. Note here that the cylinder is not a limiting example, and it can be a virtual polygonal pipe (hereinafter called a polygonal pipe) or alternatively, it can be a virtual hemisphere (hereinafter called a hemisphere) or a virtual hemi-polyhedron (hereinafter called a hemi-polyhedron). The panoramic image is a 360-degree landscape seen from the viewpoint 01 and can have any shape as long as it is a three-dimensional object surrounding the viewpoint 01.

Herein, a comparison is made between the case where the panoramic image is a side face of a cylinder or a polygonal pipe created in the virtual world and the case where it is a side face of a hemisphere or a hemi-polyhedron. In the case where the panoramic image is a side face of a cylinder or a polygonal pipe, the panoramic image will be a horizontally 360-degree landscape. On the other hand, in the case where it is a side face of a hemisphere or a hemi-polyhedron, the panoramic image will be a horizontally and vertically 360-degree landscape, and therefore this case has an advantage that the panoramic image also includes a portion just above the virtual world. In general, because the range that the own avatar views in the virtual world is a horizontally 360-degree landscape, even the side face of a cylinder or a polygonal pipe can be sufficient for the panoramic image.

Another comparison is made between the case where the panoramic image is a side face of a cylinder or a hemisphere and the case where it is a side face of a polygonal pipe or a hemi-polyhedron. As compared with the case where the panoramic image is a side face of a cylinder or a hemisphere, a processing speed is higher than in the case where the panoramic image is a side face of a polygonal pipe or a hemi-polyhedron. However, the distortion in the image is less in the case where the case where the panoramic image is a side face of a cylinder or a hemisphere. This is because the image processing is conducted in a face for a polygonal column and a polyhedron, whereas the image processing is conducted at a point for the cylinder and the sphere. However, the distortion in the image occurring when the panoramic image is a side face of a polygonal pipe or a hemi-polyhedron is within the margin of error, which is not different so much from the case where the panoramic image is a side face of a cylinder or a sphere. Therefore, the panoramic image can be a side face of a cylinder or a hemisphere and can be a side face of a polygonal pipe or a hemi-polyhedron.

Figure 5:
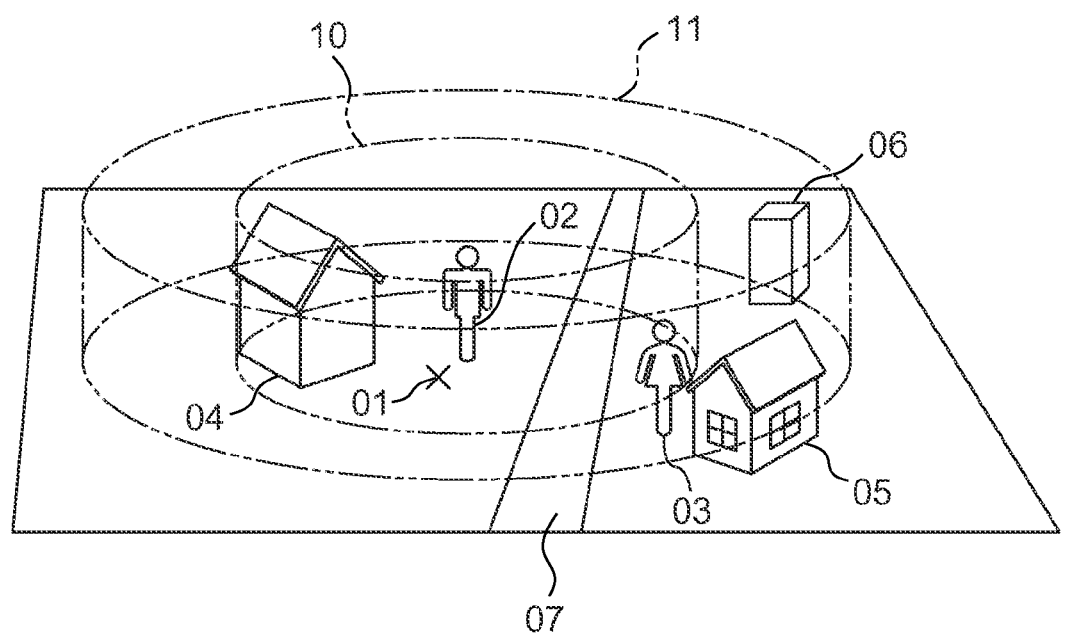
FIG. 5 illustrates two virtual cylinders created with different diameters centering around a viewpoint in a virtual world.

FIG. 5 illustrates two cylinders created with different diameters centering around the viewpoint 01 in the virtual world. In FIG. 5, the respective side faces of a cylinder 10 and a cylinder 11 with different diameters provide two panoramic images. A building 04 and a road 07 residing within the cylinder 10 are rendered on the side face of the cylinder 10, thus creating a panoramic image. A building 05 and a building 06 residing within the cylinder 11 are rendered on the side face of the cylinder 11, thus creating a panoramic image. Although the road 07 extends across the cylinders 10 and 11, it is rendered on the side face of the inner cylinder 10 only.

In other words, a static object residing in the cylinder 10 with a shorter diameter than that of the cylinder 11, which resides in the cylinder 11 as well although, is not rendered as the panoramic image on the side face of the cylinder 11, i.e. a static object residing in a cylinder with a shorter diameter than another cylinder, which resides in the other cylinder as well although, is not rendered as the panoramic image on the side face of the other cylinder. This is because it is enough to render a static object as one panoramic image.

In the above example, two panoramic images are created. However, the number of the panoramic images created is not limited to two, and any number is possible. This is because a plurality of panoramic images created results in less panoramic images in number to be created when an own avatar moves, which will be described later in detail. The distance from the viewpoint 01 to a cylinder or the like can be any distance. The reasons therefor will be described later in detail. The cylinders do not necessarily have to be created at equal intervals; for example, their diameters can be increased with decreasing proximity to the viewpoint 01.

Figure 6:
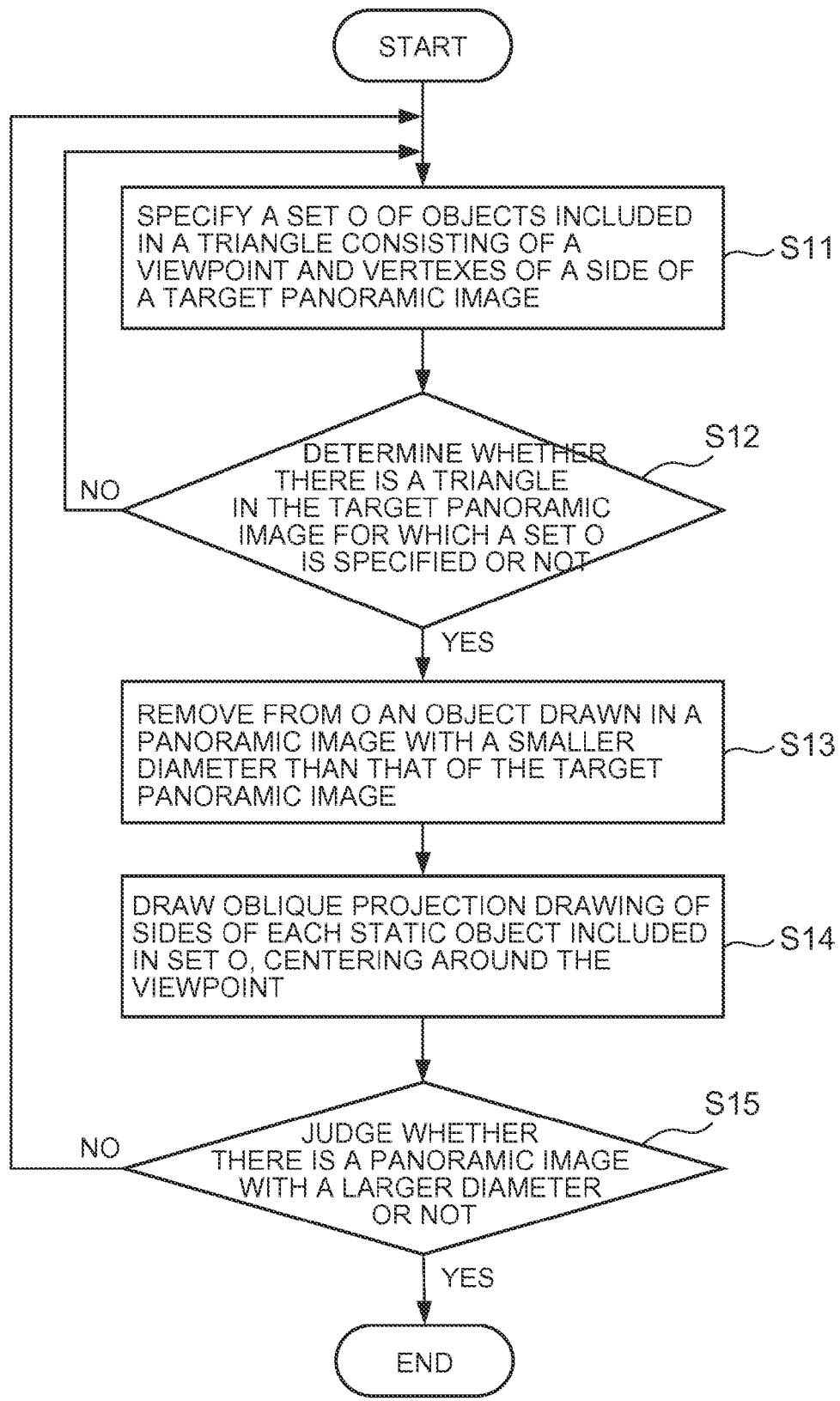
FIG. 6 is a flowchart of panoramic image creation processing.
Figure 7:
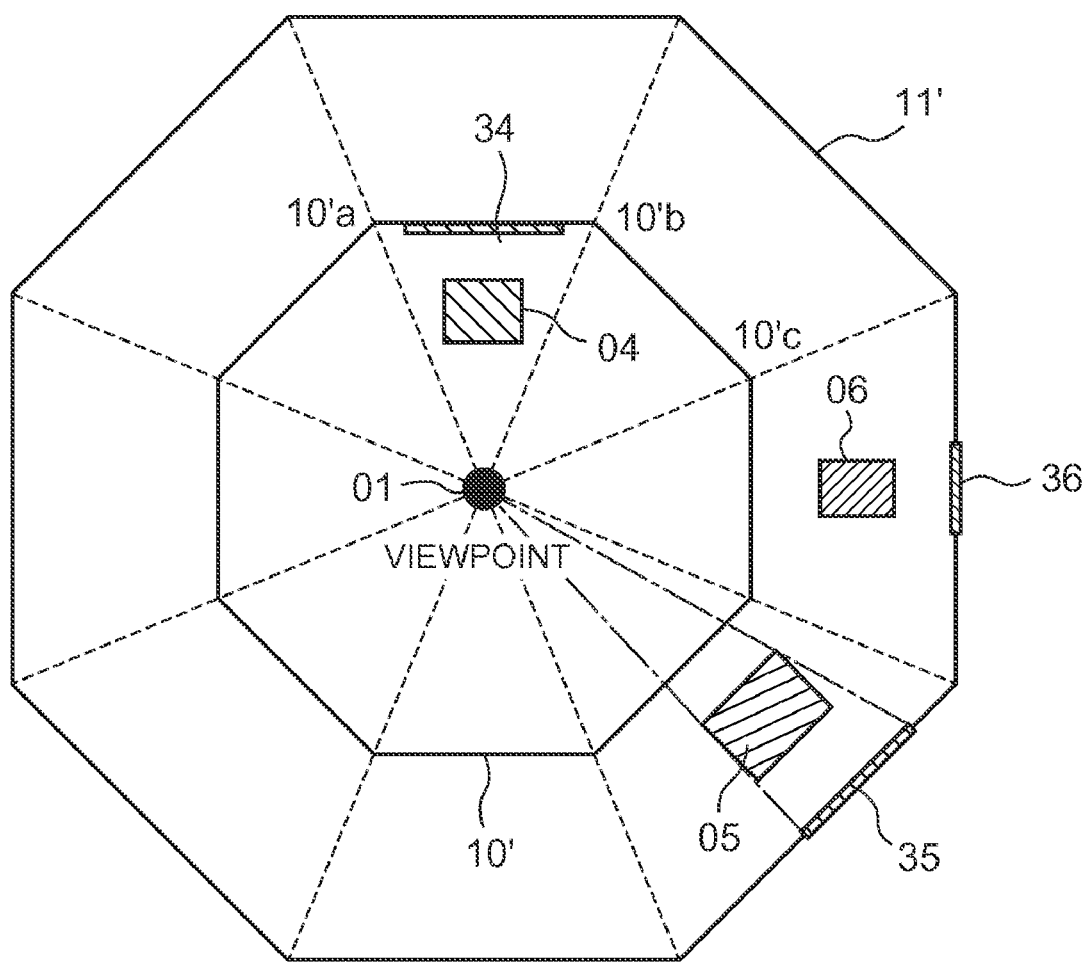
FIG. 7 is a top view showing a method for creating a panoramic image based on virtual regular octagon pipes.

FIG. 6 is a flowchart of the panoramic image creation processing. As described above, the panoramic image can be created based on a cylinder or based on a polygonal pipe and the following describes the case where the panoramic image is created based on a regular octagon. FIG. 7 illustrates a method of making the cylinders of FIG. 5 as regular octagons and creating a panoramic image based on the regular octagons. FIG. 7 is a top view of the regular octagon pipes, representing the virtual world in two-dimensional. With reference to this drawing, the flowchart of the image drawing processing will be described below.

At Step S11, the panoramic image creation unit 111 specifies a set O of static objects included in a triangle having both vertexes of a side of a regular octagon and the viewpoint 01. In the panoramic image creating processing, a panoramic image closer to the viewpoint 01 is created earlier, so that the panoramic image in FIG. 7 is created in the order of a regular octagon 10' and a regular octagon 11'. With reference to FIG. 7, the processing at Step S11 will be described below more specifically. The panoramic image creation unit 111 specifies the building 04 included in a triangle having vertexes 10'$a$ and 10'$b$ and the viewpoint 01 (hereinafter called a triangle 1) as the set O. Since the triangle 1 does not include other static objects, the set O includes the building 04 only.

Next, at Step S12, the panoramic image creation unit 111 determines whether there is a triangle in the panoramic image designated as a target for which a set O is specified or not. In FIG. 7, because there are triangles for each of which a set O is not specified, the panoramic image creation unit 111 subsequently specifies a static object included in a triangle having the vertexes 10'$b$ and 10'$c$ and the viewpoint 01 (hereinafter called a triangle 2) as the set O. Because the triangle 2 does not include a static object, any static object is not added to the set O. In this way, the panoramic image creation unit 111 specifies static objects included in each of the triangles making up the regular octagon 10' as the set O, where the set O includes the building 04 only.

Next, the panoramic image creation unit 111 removes a static object drawn in a regular octagon with a smaller diameter than that of the panoramic image as a target from the set O (Step S13). Because no regular octagon with a smaller diameter than that of the regular octagon 10' exists in the regular octagon 10', this processing is not conducted for the regular octagon 10'. Then, the panoramic image creation unit 111 draws an oblique projection drawing of sides of each static object included in the set O, centering around the viewpoint 01 (Step S14). More specifically, the panoramic image creation unit 111 extends visual lines from the viewpoint 01 toward the building 04 included in the set O and draws a panoramic building 34 that is a projection drawing of the building 04 at intersections of the extended visual lines with the side including the vertexes 10'$a$ and 10'$b$.

Next, the panoramic image creation unit 111 determines whether there is a regular octagon with a larger diameter or not (Step S15). If there is such a regular octagon, the processing from Step S11 to Step S15 is repeated. The following describes the image creation processing for the regular octagon 11'. At Steps S11 and S12, the panoramic image creation unit 111 creates a set O similar to the case of the regular octagon 10', where the buildings 04, 05 and 06 are specified for the set O. At Step 13, the panoramic image creation unit 111 removes an object drawn in a panoramic image as the side face of the regular octagon 10' with a smaller diameter than that of the regular octagon 11', i.e., the building 04, from the set O. As a result, at Step S14, the buildings 05 and 06 included in the set O are drawn as panoramic buildings 35 and 36, respectively. In FIG. 7, since there is no regular octagon larger than the regular octagon 11', the image creation processing ends.

Figure 8:
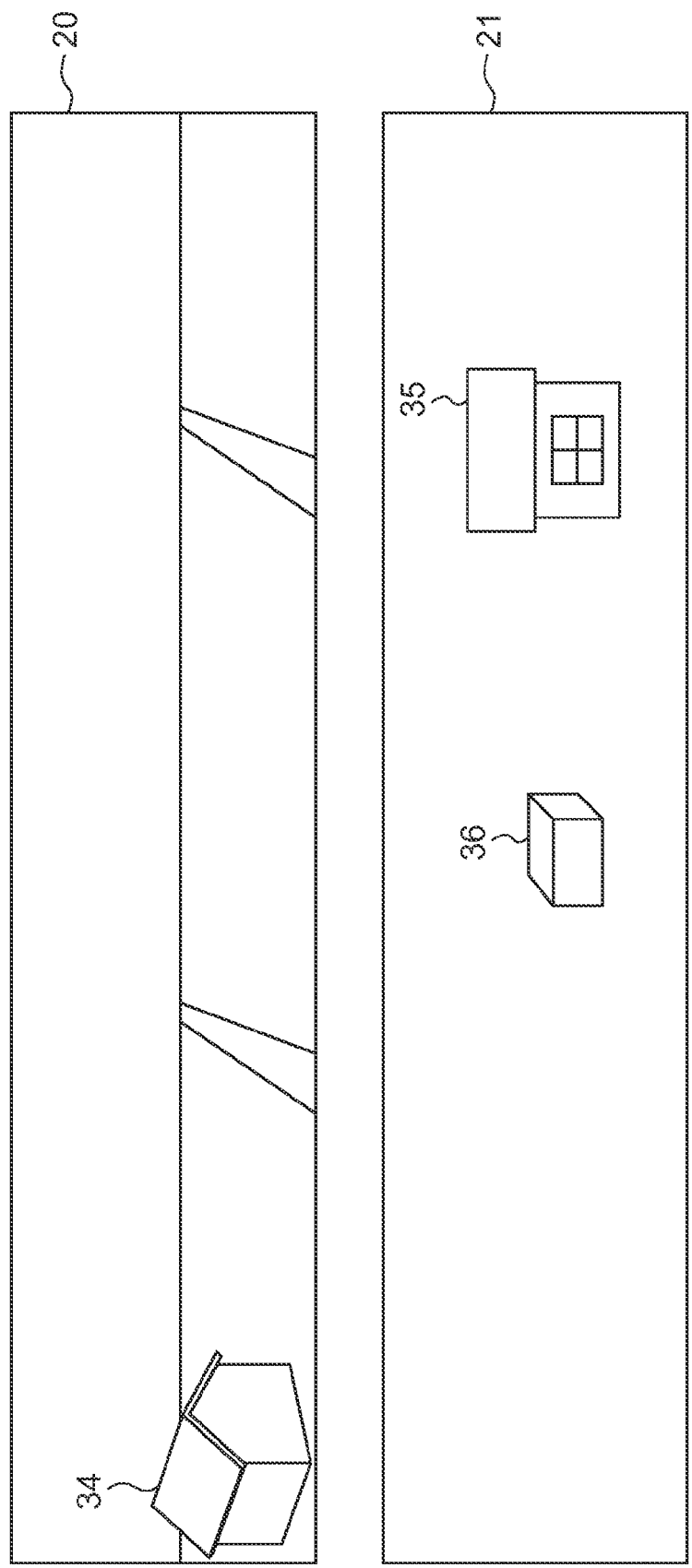
FIG. 8 illustrates the created panoramic image.

FIG. 8 illustrates the created panoramic images. A panoramic image 20 as the side face of the regular octagon 10' includes the panoramic building 34 drawn as a result of the rendering of the building 04. A panoramic image 21 created based on the regular octagon 11' includes the panoramic buildings 35 and 36 drawn.

Referring back to FIG. 3, when the panoramic image is created at Step S1, the resolution conversion unit 112 converts a resolution of the panoramic image created at Step S1 into a resolution matching with a display image of a mobile phone 200 as a transmission destination (Step S2). As described with reference to FIG. 1, the client terminals can be computers or low-performance devices such as mobile phones. Therefore, the resolution of a display will vary depending on the type of the client terminals so that there is a need to send a panoramic image having a resolution that matches with the terminal clients.

If a panoramic image having a resolution for a computer is transmitted to a low-performance device such as a mobile phone 200, it will be difficult for the low-performance device to process such an image. On the other hand, if a panoramic image of the low-performance device resolution is transmitted to a computer, aliasing called "baggy" occurs in the image or letters displayed in a display of the computer, which will cause poor viewability for a user.

The panoramic image control unit 110 transmits the panoramic image and information on a dynamic object to the mobile phones 200 via the communication unit 101 (Step S3). The dynamic object can be, for example, an avatar. The information on the dynamic object transmitted at Step S3 is information on the other avatar 03 and does not contain information on the own avatar 02. Because each mobile phone 200 has the information on the own avatar 02, there is no need to transmit such information from the image drawing server 100.

The range for acquiring the dynamic object information can be the inside of the outermost panoramic image. This is because dynamic objects close to the own avatar only can be displayed or all dynamic objects within a viewable range from the viewpoint can be displayed. The synthesis rendering unit 202 stores the panoramic image transmitted from the communication unit 101 to the mobile phones 200 at Step S3 in the panoramic image storage unit 220 (Step S4). The panoramic image stored in the panoramic image storage unit 220 is called when the own avatar 02 moves, which is used for the rendering processing.

Figure 9:
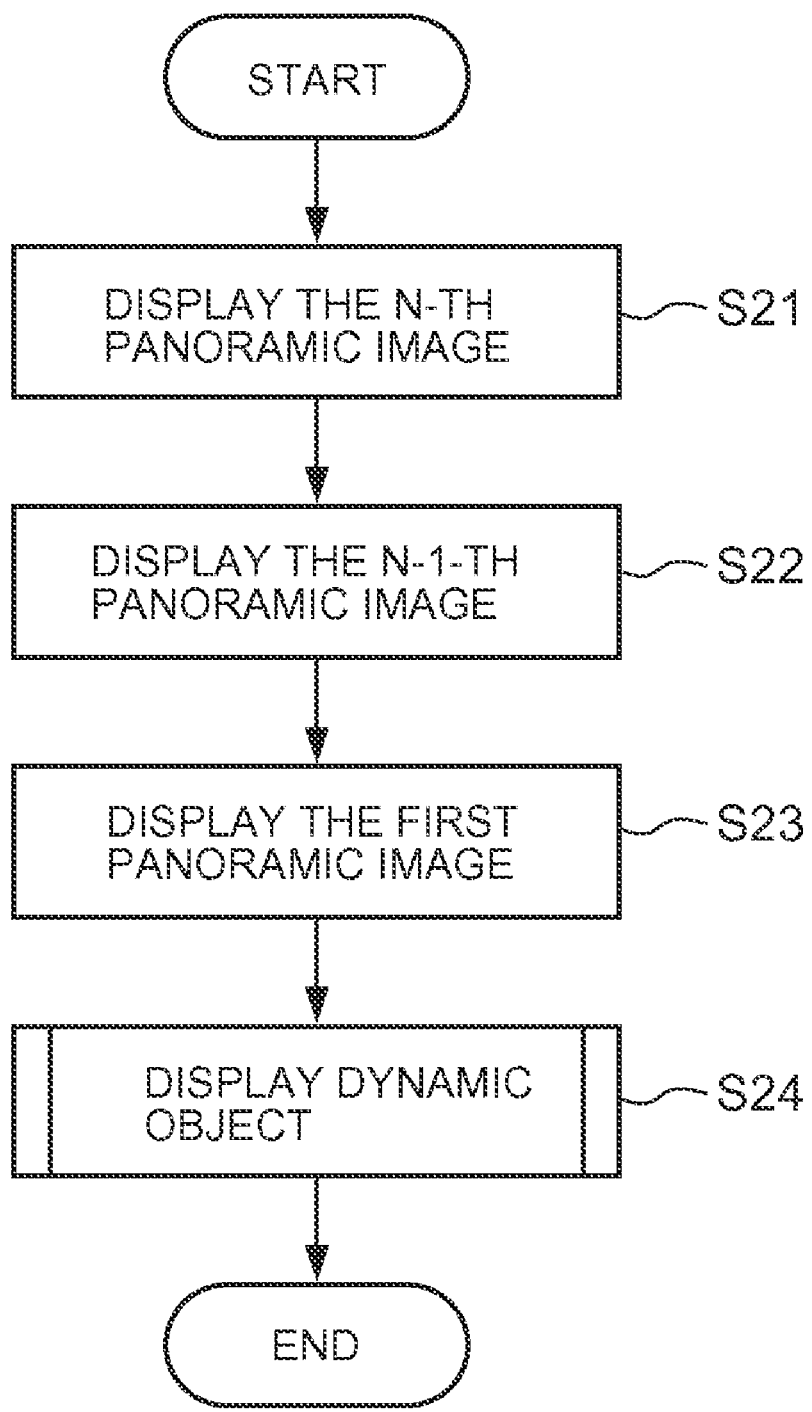
FIG. 9 is a flowchart of rendering processing conducted by a synthesis rendering unit.

Next, based on the panoramic image and the dynamic object information, a virtual world image is created (Step S5), and the virtual world image is outputted as an output image (Step S6). The following describes the rendering processing by the mobile phones 200 where the virtual world image is created based on the panoramic image and the dynamic object information. FIG. 9 is a flowchart of the rendering processing conducted by the synthesis rendering unit 202. A mobile phone 200 receives the panoramic image and information on the other avatar 03 from the image drawing server 100. Alternatively, when the user of the mobile phone 200 moves the own avatar 02, the rendering processing starts.

N pieces of panoramic images are created in the order of decreasing proximity to the viewpoint 01 while centering around the viewpoint 01, where they are numbered from a first to a N-th. First, the synthesis rendering unit 202 displays the N-th panoramic image that is the furthest from the viewpoint 01 (Step S21). Next, the synthesis rendering unit 202 displays the N−1-th, the N−2-th panoramic images, and etc., one by one in the order increasing the proximity to the viewpoint 01 (Step S22). The N−1-th panoramic image is overlaid on the N-th panoramic image. The subsequent panoramic images are displayed in a similar manner such that a panoramic image closer to the viewpoint 01 is overlaid thereto.

Finally, the synthesis rendering unit 202 displays the first panoramic image that is the closest to the viewpoint 01 (Step S23). When all of the panoramic images are displayed to create the background image, the background image, the own avatar 02 held in the mobile phone 200 and the other avatar 03 as the dynamic object received from the image drawing server 100 are displayed (Step S24). When the display of the own avatar 02 and the other avatar 03 as the dynamic object are finished, an image to be displayed on the display has been completed and the completed image is sent to the output unit 204.

Figure 10:
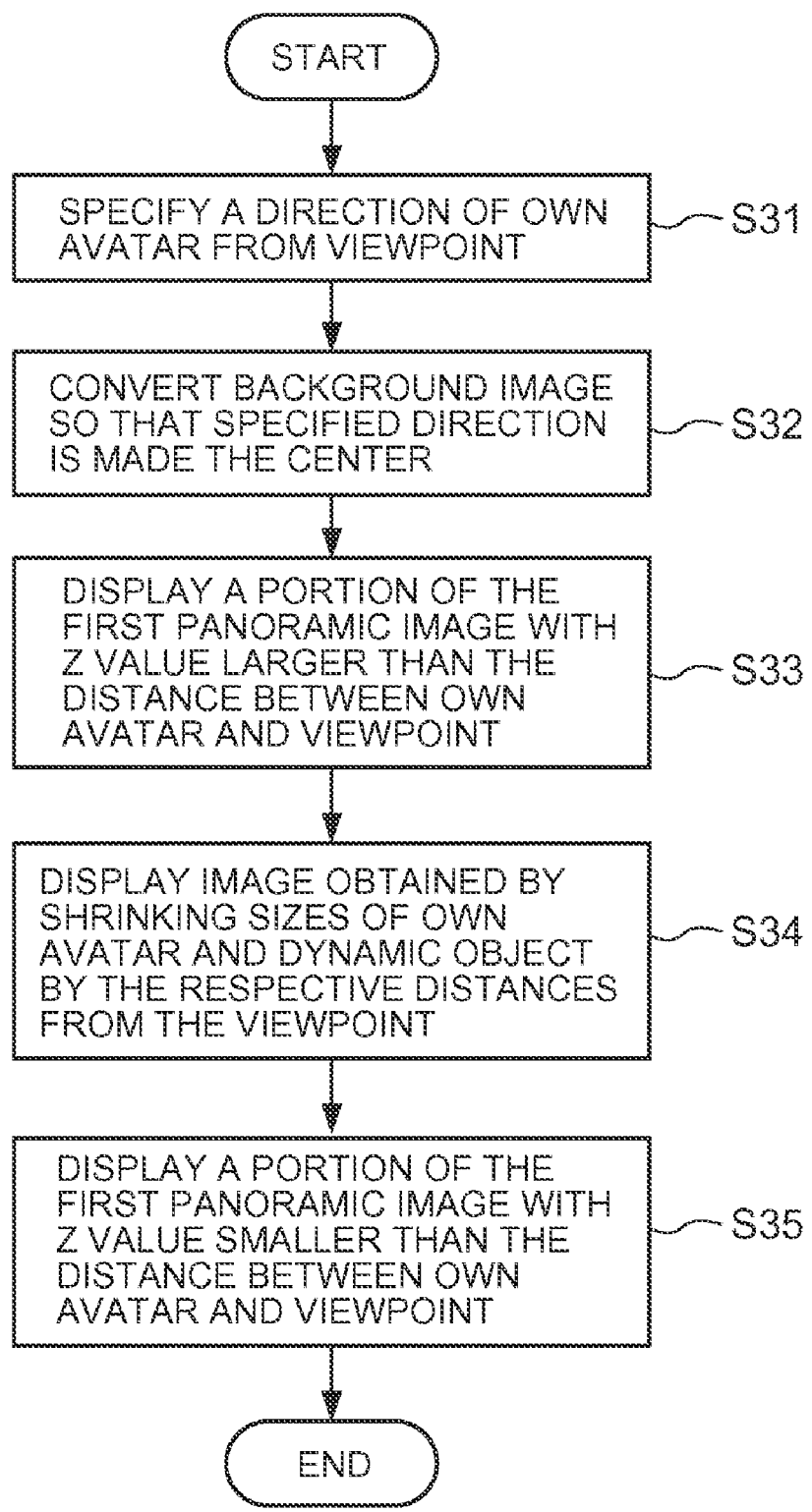
FIG. 10 is a flowchart of the processing where an own avatar and a dynamic object are displayed on a background image.

FIG. 10 is a flowchart of the processing where the own avatar 02 and the other avatar 03 as the dynamic object are displayed on the background image.

First, the synthesis rendering unit 202 specifies a direction of the own avatar 02 from the viewpoint 01 (Step S31). Because the background is a 360-degree scenery image, the entire image cannot be displayed on the display of the mobile phone 200. Thus, the direction of the own avatar 02 from the viewpoint 01 is specified, and a partial image in the specified direction only is set as a display target of the display of the mobile phone 200.

Subsequently, the synthesis rendering unit 202 converts the background image so that the specified direction is made the center (Step S32). The panoramic image closest to the viewpoint 01 has a Z value representing a position in the depth direction, and the synthesis rendering unit 202 displays a portion in the first panoramic image closest to the viewpoint 01 with a Z value larger than the distance between the own avatar 02 and the viewpoint 01 (Step S33). The Z value will be described later in detail.

The panoramic image that is the closest to the viewpoint 01 has action information. The action information, as described above, can relate to an open/close function of a door. Provided is a description of one specific example where the action information of the "door opens outwardly" is added to a door portion of the building in the panoramic image closest to the viewpoint 01. When the own avatar 2 touches the door, a message of "will you open the door?" as well as a button of "yes, no" are displayed. When "yes" is selected, the door will open outwardly. In this way, the panoramic image has action information, thus enabling the panoramic image to move. Further, in order to represent the movement of a static object, there is no need to communicate with the image drawing server 100, thus enabling the representation of a smooth movement of the static object even in the mobile phone 200.

The synthesis rendering unit 202 displays an image obtained by shrinking the size of the own avatar 02 and the size of the other avatar 03 as the dynamic object by the distances from the own avatar 02 and the other avatar 03 as the dynamic object, respectively, to the viewpoint (Step S34).

Finally, the synthesis rendering unit 202 displays a portion in the first panoramic image with a Z value smaller than the distance between the own avatar 02 and the viewpoint 01 (Step S35). The sizes of the own avatar 02 and the other avatar 03 as the dynamic object are shrunk in accordance with the distances from the own avatar 02 and the other avatar 03 as the dynamic object to the viewpoint 01, whereby the virtual world can be represented.

Figure 11:
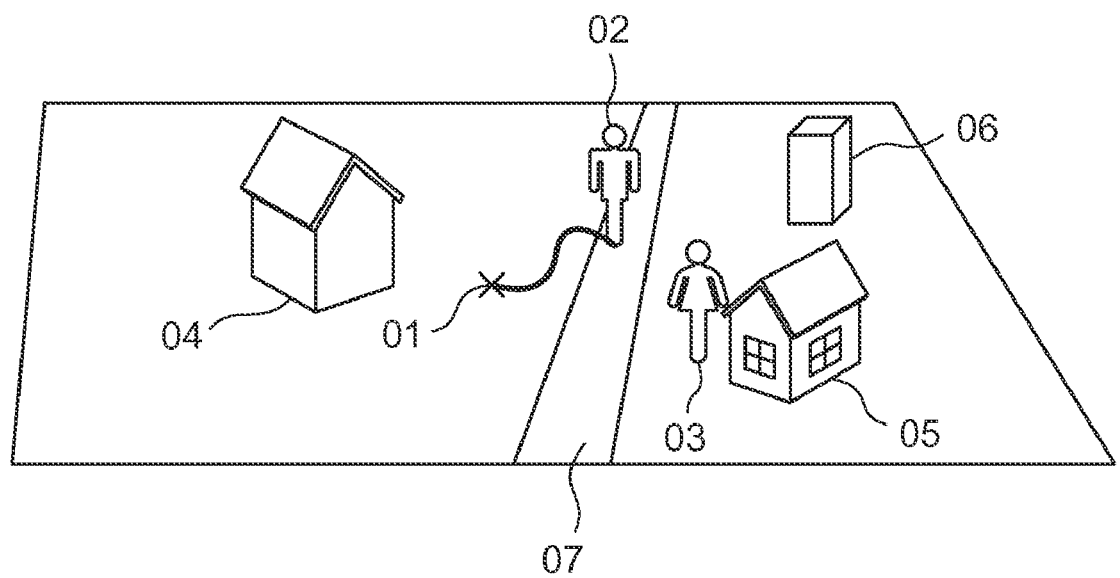
FIG. 11 illustrates the virtual world after the own avatar moves from the position of FIG. 4.
Figure 12C:
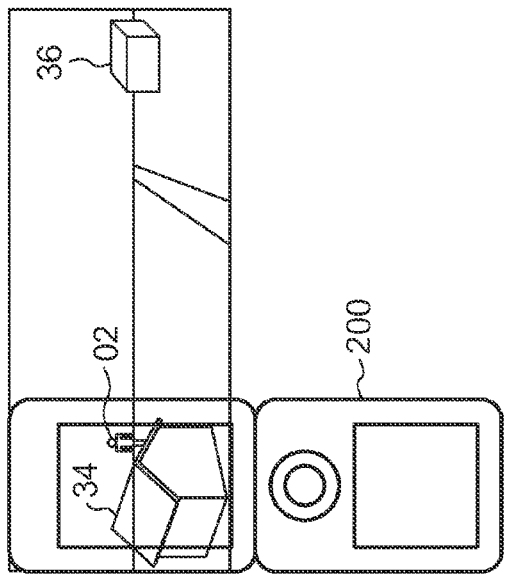
FIGS. 12A to 12C illustrate the displayed own avatar 02 residing at various positions in the virtual world on a display of a mobile phone.
Figure 12A:
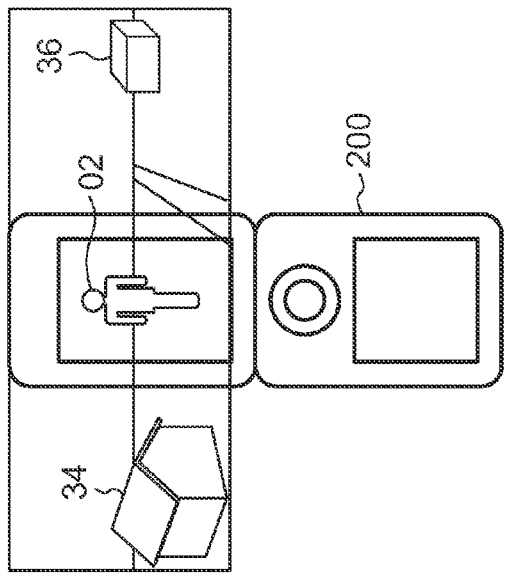
Figure 12B:
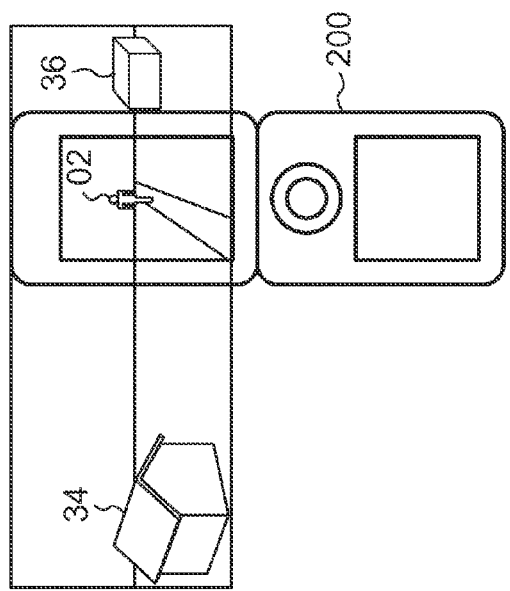

Next, the image creation processing conducted when the own avatar 02 moves is described below. FIG. 11 illustrates the state where the own avatar 02 moves from the position of FIG. 4. FIGS. 12A to 12C illustrate the displayed own avatar 02 residing at various positions in the virtual world on the display of the mobile phone 200. FIG. 12A illustrates the virtual world of FIG. 4 that is displayed on the mobile phone display of the user manipulating the own avatar 02. When the own avatar 02 moves from the position of FIG. 4 to the position of FIG. 11, the mobile phone 200 displays as in FIG. 12B. Along with the movement of the own avatar 02, the display of the mobile phone 200 changes from FIG. 12A to FIG. 12B. As illustrated in FIGS. 12A and 12B, the display of the mobile phone 200 changes, but the background image used does not change. In this way, the scale of the own avatar 02 as well as a portion to be displayed in the entire background image are changed, whereby the movement of the own avatar 02 can be represented even for the same background image. When the other avatar 03 moves, the mobile phone 200 accordingly receives information on the movement of the other avatar 03 from the image drawing server 100. Based on the information on the movement of the other avatar 03 received by the mobile phone 200, the synthesis rendering unit 202 draws the other avatar 03.

As described above, the movement of the own avatar 02 can be represented using the same background image as that before the movement by changing the scale of the own avatar 02 and the portion to be displayed on the display, only when the avatar 02 moves within the distance from the viewpoint 01 to the panoramic image closest to the viewpoint 01 making up the background image. When the own avatar 02 moves beyond the distance from the viewpoint 01 to the panoramic image closest to the viewpoint 01, the own avatar 02 cannot see the panoramic image closest to the viewpoint 01 any longer, and therefore a background image has to be newly created.

When the own avatar 02 moves within the distance from the viewpoint 01 to the panoramic image closest to the viewpoint 01, the background image used before the movement can be used. Therefore, there is no need for the image drawing server 100 to create and transmit a new panoramic image. Thus, the load on the image drawing server 100 and the communication load thereof can be reduced. Further, there is no need for the mobile phone 200 to create a new background image; the load on the mobile phone 200 can be reduced as well.

FIG. 12C illustrates the display of the mobile phone 200 displaying the own avatar 02 hidden behind the building. For a building in the panoramic image closest to the viewpoint 01 that is overlaid on the top when the background image is created and that can be an obstacle for the movement of the own avatar 02, a Z value is set, indicating a position in the depth direction. Setting the Z value for the building or the like enables the representation of a region to which the own avatar 02 cannot move. When the own avatar 02 and the other avatar 03 move behind the building, the own avatar 02 can be considered to be further apart from the viewpoint 01 by the distance corresponding to the Z value, and the scale of the own avatar 02 can be changed accordingly, thus allowing the representation in perspective. In FIG. 12C, the Z value set for the panoramic building 34 enables the representation of the state where the own avatar 02 resides behind the panoramic building 34. As stated above, with the use of the Z value, the background image created using the panoramic images can be represented in perspective, thus enabling the representation of three-dimensional virtual world.

Figure 13:
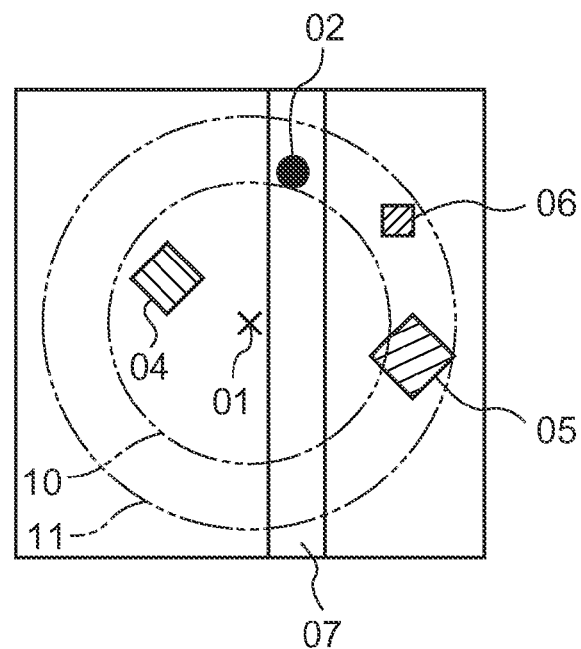
FIG. 13 illustrates the state where the own avatar goes beyond the diameter of the panoramic image created when the own avatar is in the vicinity of the viewpoint.
Figure 14:
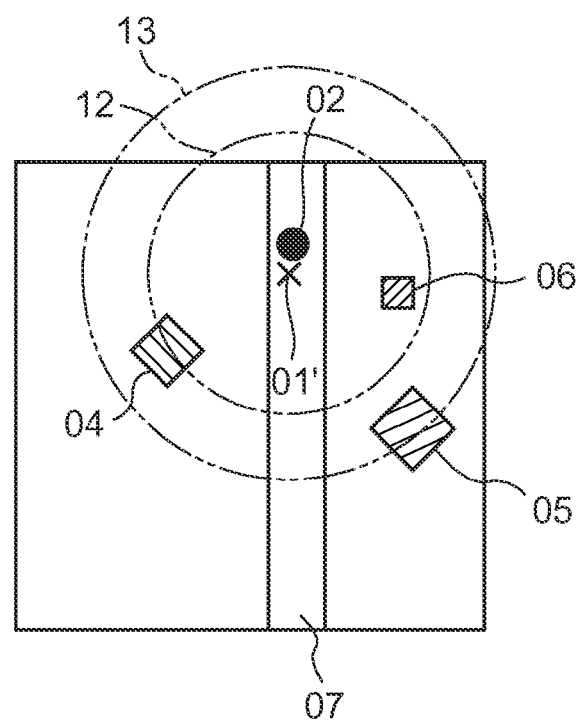
FIG. 14 is a top view illustrating cylinders of newly created panoramic images.

FIG. 13 is a top view illustrating the state where the own avatar 02 goes beyond the diameter of the panoramic image 10 created when the own avatar 02 is in the vicinity of the viewpoint 01. When the own avatar 02 goes beyond the diameter of the panoramic image 10, the mobile phone 200 requests a new panoramic image to the image drawing server 100. The image drawing server 100 creates a new viewpoint 01' at a position very close to the current position of the own avatar 02, and creates a panoramic view centering around the viewpoint. FIG. 14 is a top view illustrating cylinders of the newly created panoramic images. The panoramic images 12 and 13 are created centering around the new viewpoint 01'. When the panoramic views 12 and 13 are created, the panoramic images 10 and 11 based on the original viewpoint 01 are no longer used.

Figure 15A:
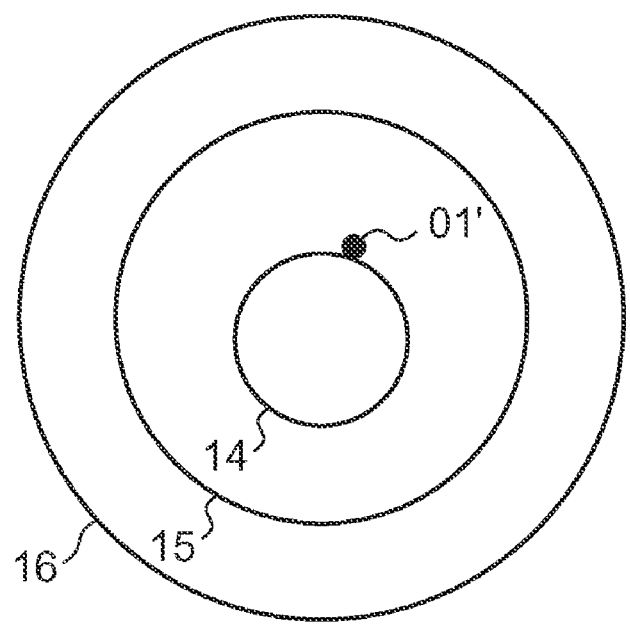
FIGS. 15A and 15B illustrate the panoramic images other than that which is closest to the own avatar being used continuously without change when the own avatar moves.
Figure 15B:
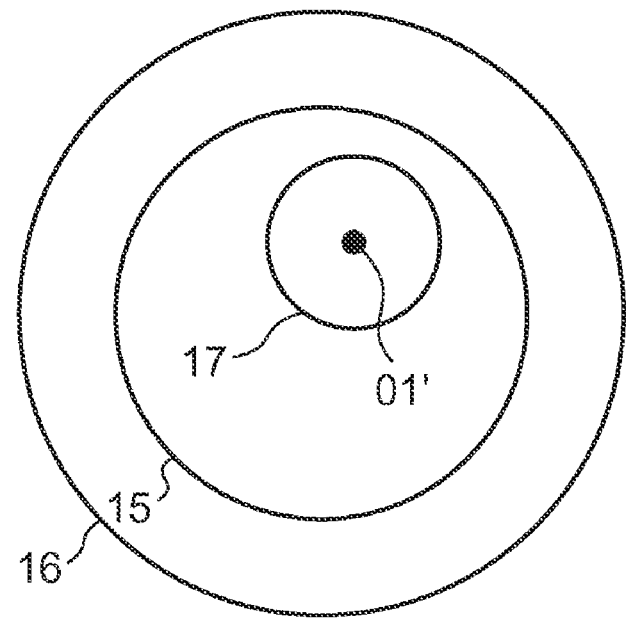

FIGS. 15A and 15B are top views illustrating the panoramic images other than that which is the closest to the own avatar 02 being used continuously without change when the own avatar 02 moves. FIG. 15A illustrates the creation of the new viewpoint 01' outside the panoramic view 14 based on the original viewpoint when the own avatar 02 moves. FIG. 15B illustrates the state where a panoramic image 17 is created centering around the new viewpoint 01'. In FIG. 15B, the panoramic view 17 closest to the new viewpoint 01' is created centering around the viewpoint 01'. However, the panoramic images 15 and 16 used before the movement to the viewpoint 01' and that do not intersect with the newly created panoramic image can be used continuously as they were. In this regard, however, the panoramic image 15 next outside of the newly created panoramic image has to be corrected by expanding or shrinking it in accordance with the distance from the new viewpoint 01'. This is because the change from the viewpoints 01 to 01' causes a significant change in the distance from the panoramic image 15 next outside of the newly created panoramic image to the viewpoint.

When the own avatar 02 moves, all of the panoramic images can be created again as shown in FIG. 14. Alternatively, as shown in FIGS. 15A and 15B, the panoramic images stored in the panoramic image storage unit 220 are reused, whereby the image drawing server 100 can create required minimum panoramic images only and transmit the same to the mobile phone 200. Thus, the processing load on the image drawing server 100 and the mobile phone 200 can be reduced, reducing the communication load from the image drawing server 100. The reduction in communication load transmitted to the mobile phone 200 leads to a decrease in processing load on the mobile phone 200, so that three-dimensional virtual world can be provided to a low-performance device such as a mobile phone 200. In addition, as for the a newly created panoramic image, a difference from the panoramic image stored in the panoramic image storage unit 220 only can be transmitted, thus further reducing the communication load.

In FIGS. 14 and 15, when the own avatar 02 goes beyond the diameter of the panoramic image, the new viewpoint 01' is provided and a new panoramic image is created. However, when a new image is created after the own avatar 02 goes beyond the diameter, the drawing cannot be performed quickly in some cases. In such a case, at the time when the own avatar 02 is about to go beyond the diameter, a new viewpoint 01' can be provided, and based on the viewpoint 01', the image drawing server 100 can create a panoramic image and transmit the same to the mobile phone 200 beforehand. Thereby, when own avatar 02 goes beyond the diameter of the panoramic image, the panoramic image stored in the panoramic image storage unit 220 of the mobile phone 200 simply can be drawn, thus enabling quick screen switching.

Further, panoramic images based on any number of viewpoints 01 can be created beforehand, and the image drawing server 100 can hold the same beforehand, and such panoramic images can be used repeatedly for users who manipulate their own avatars 02 residing in the same diameters with the panoramic images. Thereby, there is no need to create the same image again and again, thus reducing the load on the image drawing server. The panoramic image created beforehand can have a high resolution so that it can be provided to various mobile phones 200 by converting the resolution into a lower resolution. This is because a lower resolution cannot be converted into a higher resolution.

Figure 16:
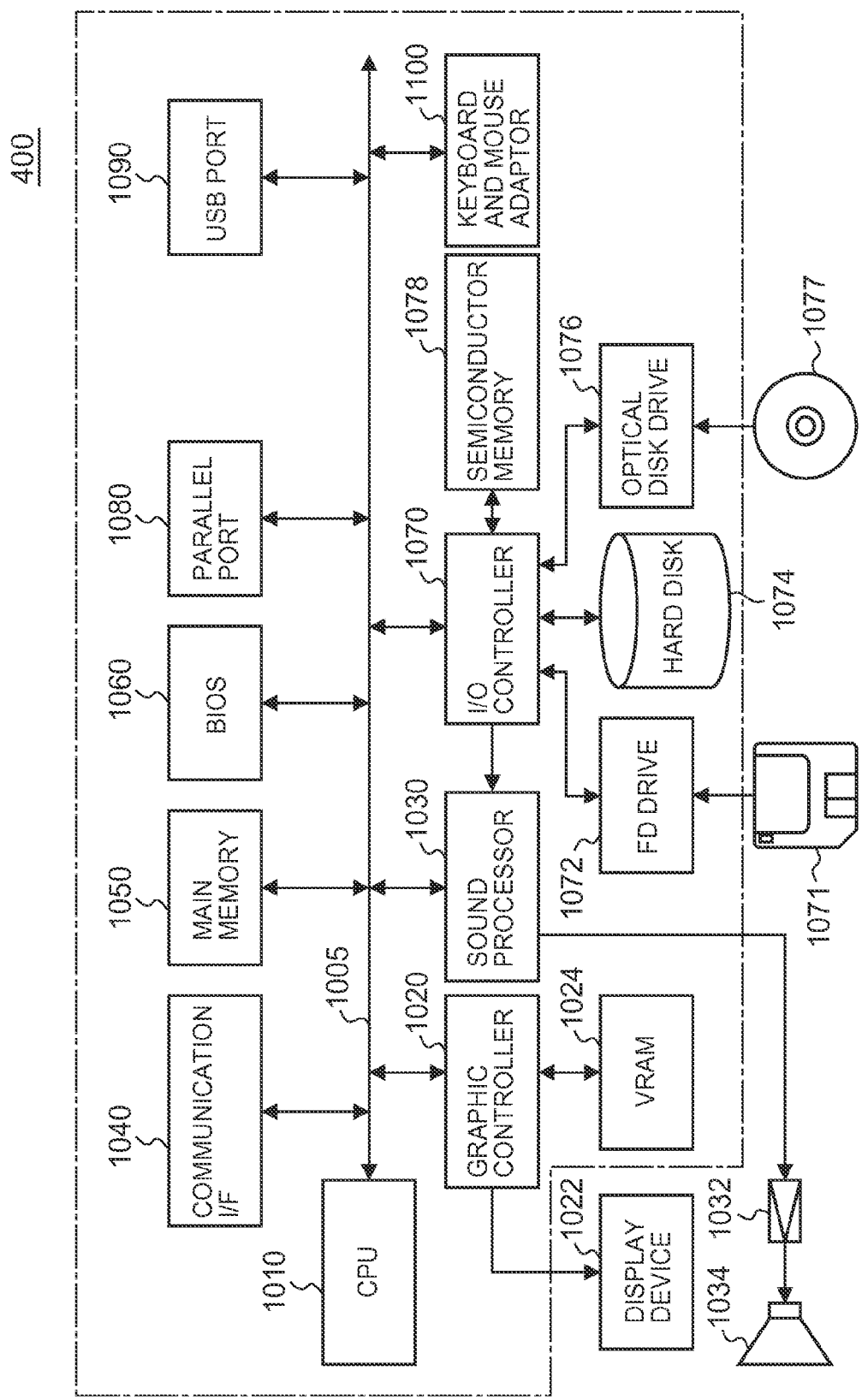
FIG. 16 illustrates an information processing apparatus as a typical hardware configuration example of the image drawing server described referring to FIG. 1.

FIG. 16 illustrates an information processing apparatus 400 as a typical hardware configuration example of the image drawing server 100 described referring to FIG. 1. The following describes an exemplary hardware configuration of this information processing apparatus 400. The information processing apparatus 400 includes a Central Processing Unit (CPU) 1010, a bus line 1005, a communication I/F 1040, a main memory 1050, a Basis Input Output System (BIOS) 1060, a parallel port 1080, a USB port 1090, a graphic controller 1020, a VRAM 1024, a sound processor 1030, an I/O controller 1070, and input means such as a keyboard and mouse adaptor 1100. The I/O controller 1070 can be connected to a storage means such as a flexible disk (FD) drive 1072, a hard disk 1074, an optical disk drive 1076, and a semiconductor memory 1078.

The sound processor 1030 is connected to an amplifier circuit 1032 and a speaker 1034. The graphic controller 1020 is connected to a display device 1022.

The BIOS 1060 stores a boot program that the CPU 1010 executes at the activation of the information processing apparatus 400, a program depending on hardware of the information processing apparatus 400 and the like. The flexible disk (FD) drive 1072 reads out a program or data from a flexible disk 1071, and provides the same to the main memory 1050 or the hard disk 1074 via the I/O controller 1070.

As the optical disk drive 1076, a DVD-ROM drive, a CD-ROM drive, a DVD-RAM drive, or a CD-RAM drive can be used, for example. At this time, an optical disk 1077 complying with each drive has to be used. The optical disk drive 1076 can read out a program or data from the optical disk 1077, and provide the same to the main memory 1050 or the hard disk 1074 via the I/O controller 1070.

A computer program provided to the information processing apparatus 400 is stored in a recording medium such as the flexible disk 1071, the optical disk 1077 or the memory card, which is provided by a user. This computer program is read out from the recording medium via the I/O controller 1070, or is downloaded via the communication I/F 1040, thus being installed in the information processing apparatus 400 for execution. The operations that the computer program makes the information processing apparatus execute are the same as those in the above-described apparatus, and therefore the description thereof will be omitted.

The above-stated computer program can be stored in an external storage medium. Typical storage media include the flexible disk 1071, the optical disk 1077, or a memory card as well as a magneto-optical recording medium such as MD, and a tape medium. Alternatively, a storage device such as a hard disk or an optical disk library provided in a server system connected to a private communication network or the Internet can be used as a recording medium, and a computer program can be provided to the information processing apparatus 400 via the communication network.

Although the above example has been described concerning the information processing apparatus 400, functions similar to those of the above-described information processing apparatus can be implemented by installing a program having the functions described for the information processing apparatus in a computer and making the computer operate as the information processing apparatus. Thus, the information processing apparatus described as one embodiment of the present invention can be implemented as a method and a computer program as well.

The apparatus of the present invention can be embodied as hardware, software or a combination of hardware and software. In an embodiment as the combination of hardware and software, a typical example includes an embodiment of a computer system having a predetermined program. In such a case, the predetermined program is loaded and executed in the computer system, whereby the program makes the computer system execute the processing according to the present invention. This program is composed of a command group that can be represented in any language, code or notation. Such a command group enables the system to execute a specific function directly, or enables the execution after any one of or both of (1) conversion into another language, code or notation and (2) copy to another medium. Of course, the present invention covers not only such a program itself but also a program product including a medium recording such a program. A program enabling the execution of the functions of the present invention can be stored in any computer readable medium such as a flexible disk, a MO, a CD-ROM, a DVD, a hard disk device, a ROM, a MRAM or a RAM. For the storage on a computer readable medium, such a program can be downloaded from another computer system connected thereto via a communication line or can be copied from another medium. Further, such a program can be compressed or can be divided into a plurality of programs, which can be stored into a single or a plurality of recording media.

Figure 17:
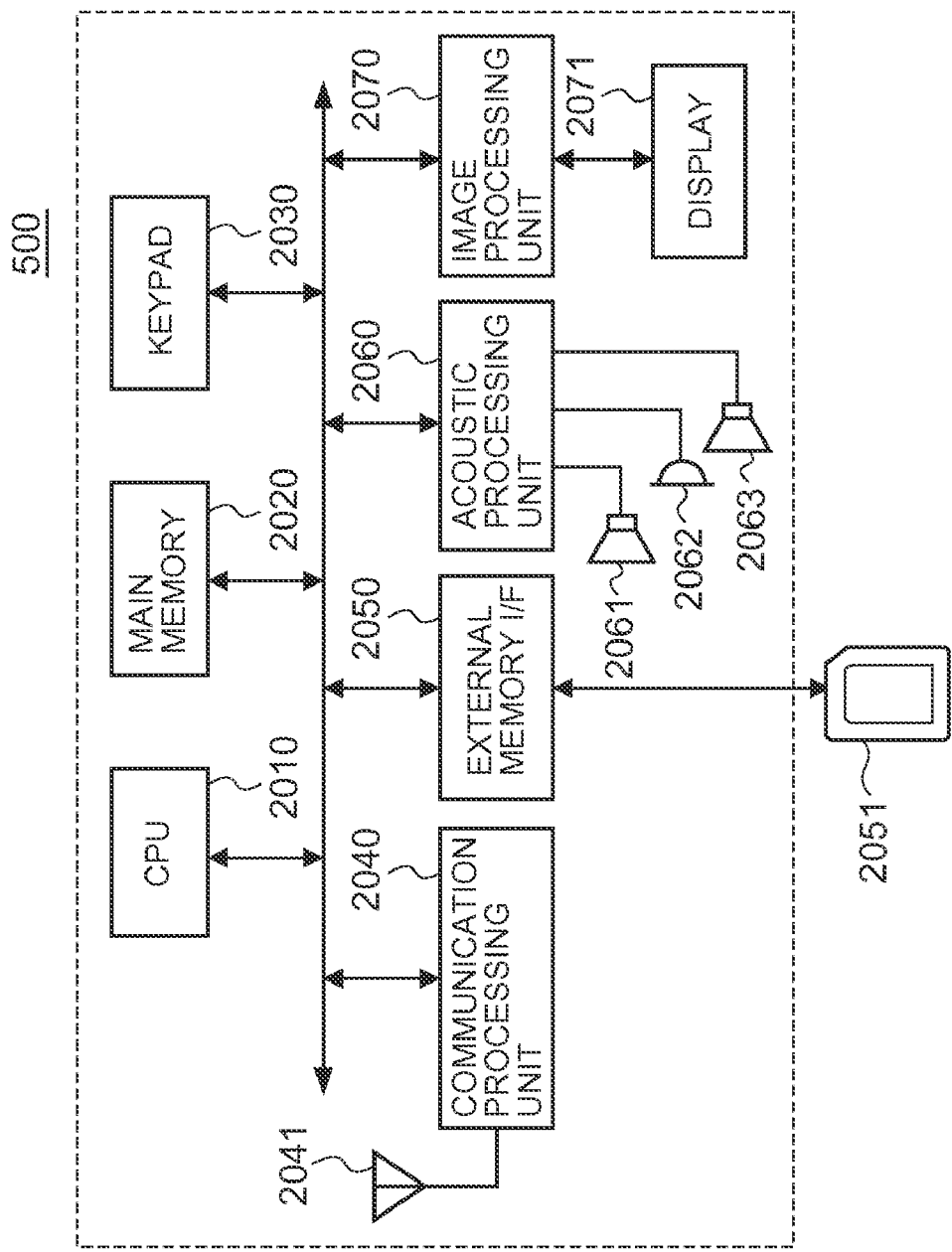
FIG. 17 illustrates a mobile phone device as a typical hardware configuration example of the mobile phone described referring to FIG. 1.

FIG. 17 illustrates a mobile phone device 500 as a typical hardware configuration example of the mobile phone 200 described referring to FIG. 1. The following describes an exemplary hardware configuration of this mobile phone device 500. The mobile phone device 500 includes a CPU 2010, a main memory 2020, a keypad 2030, a communication processing unit 2040, an external memory I/F 2050, an acoustic processing unit 2060, and an image processing unit 2070. The mobile phone device 500 further can include a camera function unit, a TV broadcast reception unit, Radio Frequency Identification (RFID) function unit and the like.

The CPU 2010 is a processing unit for executing a program stored in the main memory 2020, which conducts the processing for controlling each functional unit of the mobile phone 500, while implementing each functional unit. The main memory 2020 is composed of a Random Access Memory (RAM) and the like, which stores a program or data for implementing each functional unit of the mobile phone 500. The main memory 2020 serves as a work memory of the CPU 2010 as well.

The keypad 2030 is composed of numeric keys, a cross key and special keys, for example, and it has any form, including a touch panel, for example. The keypad 2030 receives an input operation from the user, and outputs the input data to the CPU 2010. The data can contain various types including data indicating the mail contents.

The communication processing unit 2040 is connected to a main antenna 2041 to wirelessly communicate with a base station apparatus (not illustrated). The communication processing unit 2040 performs signal processing such as demodulation processing with respect to the communication data received from the base station apparatus, and outputs the same to the CPU 2010, while performing modulation processing with respect to communication data input from the CPU 2010 and sending the same to the base station apparatus. The communication processing unit 2040 further can conduct communication by radio waves. Thus, simply by holding the mobile phone 500 over a readout terminal, communication is enabled with the readout terminal.

The external memory I/F 2050 can be a SD memory card I/F or a mini SD card I/F, which can read out a program or data from an external memory 2051 such as a SD memory card or a mini SD card and can provide the same to the main memory 2020.

The acoustic processing unit 2060 is connected to a sound output unit 2061, a sound input unit 2062, and a speaker 2063 from which ring tone, for example, is output. The image processing unit 2070 is connected to a display 2071. The display 2071 displays and outputs data input from the CPU 2010 such as a call alert, a mail creation screen, and payment candidates for electronic money.

The present invention described above conjunction with the preferred embodiments is not limited to the above-described embodiments. The effects in the embodiments of the present invention are simply described as the most preferable effects obtained from the present invention, and the effects of the present invention are not limited to those described in the embodiments or examples of the present invention.

We claim:

1. An image drawing server connected to a client terminal via a network for constructing a three-dimensional virtual world, comprising:
   a reception unit for acquiring, from the client terminal, a position of an avatar of a user of said three-dimensional virtual world in said client terminal;
   a three-dimensional object creation unit for providing a viewpoint in the vicinity of said avatar and for creating a three-dimensional object having substantially horizontal concentric polygons or concentric circles as cross sections thereof, wherein said concentric polygons or concentric circles are centered around said viewpoint;
   a panoramic image creation unit for performing a perspective projection of a static object residing in a region of a plurality of regions in said three-dimensional virtual world by dividing said three-dimensional object by borders that correspond to said concentric polygons or concentric circles, wherein said perspective projection performed for said region with respect to an outer side face of a concentric polygon or concentric circle of the concentric polygons or concentric circles, while centering around said viewpoint, to create a 360 degree two-dimensional panoramic image, wherein said perspective projection is repeated for a different static object with respect to a different region of the plurality of regions to create at least one more 360 degree two-dimensional panoramic image that corresponds to an outer side face of a different concentric polygon or concentric circle of said concentric polygons or concentric circles, and said perspective projection has not already been performed for the different concentric polygon or concentric circle; and
   a transmission unit for transmitting, to said client terminal, said 360 degree two-dimensional panoramic images and information on a dynamic object residing in a region of an outer object within the smallest concentric polygon or concentric circle of said concentric polygons or concentric circles created by said three-dimensional object creation unit;
   wherein said panoramic image creation unit adds, to one of said 360 degree two-dimensional panoramic images, action information that one of said static objects has, and wherein said client terminal displays said action information such that a user can select an action that enables interaction with one of said static objects;
   wherein said panoramic image creation unit adds a Z value to one of said 360 degree two-dimensional panoramic images residing in a region of said three-dimensional object within the closest vicinity from said viewpoint to which one of said static objects is projected, wherein said Z value represents a position of the one of said static objects in a depth direction thereof.

2. The image drawing server according to claim 1, further comprising a resolution conversion unit for converting a resolution of said 360 degree two-dimensional panoramic images.

3. The image drawing server according to claim 1, wherein said panoramic image creation unit adds, to said 360 degree two-dimensional panoramic images, data concerning a region in which said dynamic object cannot enter using said Z value.

4. The image drawing server according to claim 1, wherein said three-dimensional object is a cylinder whose bottom face is one of the cross sections when said viewpoint is provided over an earth's surface.

5. The image drawing server according to claim 1, wherein said three-dimensional object is a hemi-polyhedron or a hemisphere whose bottom face is one of the cross sections when said viewpoint is provided over an earth's surface.

6. The image drawing server according to claim 1, wherein when said avatar moves closer to a side face of a closest vicinity three-dimensional object for said viewpoint, (i) said three-dimensional object creation unit creates a new closest vicinity three-dimensional object while setting a position in the vicinity of said avatar as a new viewpoint in response to a request from said client terminal, and (ii) said panoramic image creation unit creates a new 360 degree two-dimensional panoramic image corresponding to said new closest vicinity three-dimensional object and a second closest vicinity three-dimensional object, wherein said second closest vicinity three-dimensional object is second closest to said viewpoint that has been already created.

7. The image drawing server according to claim 1, wherein said transmission unit transmits a dynamic object one by one.

8. An image drawing system in a three-dimensional virtual world configured by a client terminal and a server connected via a network, comprising:
   a three-dimensional object creation unit for providing a viewpoint in the vicinity of an avatar of a user of said three-dimensional virtual world in said client terminal and for creating a three-dimensional object having substantially horizontal concentric polygons or concentric circles as cross sections thereof, wherein said three-dimensional object has polygonal pillars or cylinders nested within, said polygonal pillars or said cylinders are tubular space figures having substantially congruent two plane figures, and said concentric polygons or concentric circles are centered around said viewpoint;
   a panoramic image creation unit for performing a perspective projection of a static object residing in a region of a plurality of regions in said three-dimensional virtual world by dividing said three-dimensional object by borders that correspond to said concentric polygon or concentric circles, wherein said perspective projection performed for said region with respect to an outer side face of a concentric polygon or concentric circle of the concentric polygons or concentric circles, while centering around said viewpoint, creates a 360 degree two-dimensional panoramic image, wherein said perspective projection is repeated for a different static object with respect to a different region of the plurality of regions to create at least one more 360 degree two-dimensional panoramic image that corresponds to an outer side face of a different concentric polygon or concentric circle of said concentric polygons or concentric circles, and said perspective projection has not already been performed for the different concentric polygon or concentric circle;
   a drawing unit for overlaying said of 360 degree two-dimensional panoramic image, information on a dynamic object residing in a region of an outer object within the smallest concentric polygon or concentric circle of said concentric polygons or concentric circles created by said three-dimensional object creation unit, and an image of said avatar; and
   a panoramic image storage unit for storing said 360 degree two-dimensional panoramic image;
   wherein said panoramic image creation unit adds, to one of said 360 degree two-dimensional panoramic images, action information that one of said static objects has, and wherein said client terminal displays said action information such that a user can select an action that enables interaction with one of said static objects;
   wherein said panoramic image creation unit adds a Z value to one of said 360 degree two-dimensional panoramic images residing in a region of said three-dimensional object within the closest vicinity from said viewpoint to which one of said static objects is projected, wherein said Z value represents a position of the one of said static objects in a depth direction thereof.

9. The image drawing system according to claim 8, further comprising a resolution conversion unit for converting a resolution of said 360 degree two-dimensional panoramic images.

10. The image drawing system according to claim 8, wherein when said avatar moves, said drawing unit expands or shrinks said image of said avatar in accordance with a distance from said viewpoint.

11. The image drawing system according to claim 8, wherein when said avatar moves closer to a side face of a closest vicinity three-dimensional object for said viewpoint, said three-dimensional object creation unit creates a new closest vicinity three-dimensional object while setting a position in the vicinity of said avatar as a new viewpoint in response to a request from said client terminal,
the panoramic image creation unit creates new a 360 degree two-dimensional panoramic image corresponding to said new closest vicinity three-dimensional object and a second closest vicinity three-dimensional object, wherein said second closest vicinity three-dimensional object is second closest to said viewpoint that has been already created, and
the drawing unit redraws 360 degree two-dimensional panoramic images that have been already created corresponding to said closest vicinity three-dimensional object and said second closest vicinity three-dimensional object with said created new 360 degree two-dimensional panoramic images.

12. An image drawing method that draws an image in a three-dimensional virtual world configured by a client terminal and a server connected via a network, the method comprising the steps of:
providing a viewpoint in the vicinity of an avatar of a user of said three-dimensional virtual world in said client terminal and creating a three-dimensional object having substantially horizontal concentric polygons or concentric circles as cross sections thereof, wherein said concentric polygons or concentric circles are centered around said viewpoint;
performing a perspective projection of a static object residing in a region of a plurality of regions in said three-dimensional virtual world by dividing said three-dimensional object by borders that correspond to said concentric polygons or concentric circles, wherein said perspective projection performed for said region with respect to an outer side face of a concentric polygon or concentric circle of the concentric polygons or concentric circles, while centering around said viewpoint, to create a 360 degree two-dimensional panoramic image, wherein said perspective projection is repeated for a different static object with respect to a different region of the plurality of regions to create at least one more 360 degree two-dimensional panoramic image that corresponds to an outer side face of a different concentric polygon or concentric circle of said concentric polygons or concentric circles, and said perspective projection has not already been performed for the different concentric polygon or concentric circle;
overlaying said 360 degree two-dimensional panoramic images, information on a dynamic object residing in a region of an outer object within the smallest concentric polygon or concentric circles of said concentric polygons of concentric circles created by a three-dimensional object creation unit, and an image of said avatar; and
storing said 360 degree two-dimensional panoramic images;
wherein said panoramic image creation unit adds, to one of said 360 degree two-dimensional panoramic images, action information that one of said static objects has, and wherein said client terminal displays said action information such that a user can select an action that enables interaction with said one of static objects;
wherein said panoramic image creation unit adds a Z value to one of said 360 degree two-dimensional panoramic images residing in a region of said three-dimensional object within the closest vicinity from said viewpoint to which one of said static objects is projected, wherein said Z value represents a position of the one of said static objects in a depth direction thereof.

13. The image drawing method according to claim 12, wherein said 360 degree two-dimensional panoramic images created based on said three-dimensional object in the closest vicinity of said viewpoint has data concerning a region in which said dynamic object cannot enter using said Z value.

14. The image drawing method according to claim 12, further comprising the step of expanding or shrinking said image of said avatar in accordance with a distance from said viewpoint when said avatar moves.

15. The image drawing method according to claim 12, further comprising the steps of:
when said avatar moves closer to a side face of a closest vicinity three-dimensional object for said viewpoint, creating a new closest vicinity three-dimensional object while setting a position in the vicinity of said avatar as a new viewpoint in response to a request from said client terminal;
creating a new 360 degree two-dimensional panoramic image corresponding to said new closest vicinity three-dimensional object and a second closest vicinity three-dimensional object, wherein said second closest vicinity three-dimensional object is second closest to said viewpoint that has been already created, and
redrawing 360 degree two-dimensional panoramic images that have been already created corresponding to said closest vicinity three-dimensional object and said second vicinity three-dimensional object with said created new 360 degree two-dimensional panoramic images.

16. A computer program product comprising a non-transitory computer readable medium and instructions of a method of drawing an image in a three-dimensional virtual world configured by a client terminal and a server connected to a network, which when implemented causes a computer to execute the steps of:
providing a viewpoint in the vicinity of an avatar of a user of said three-dimensional virtual world in said client terminal and creating a three-dimensional object having substantially horizontal concentric polygons or concentric circles as cross sections thereof, wherein said concentric polygons or concentric circles are centered around said viewpoint;
performing a perspective projection of a static object residing in a region in said three-dimensional virtual world by dividing said three-dimensional object by borders that correspond to said concentric polygons or concentric circles, wherein said perspective projection performed for said region with respect to an outer side face of a concentric polygon or concentric circle of the concentric polygons or concentric circles, while centering around said viewpoint, to create a 360 degree two-dimensional panoramic image, wherein said perspective projection is repeated for a different static object with respect to a different region of the plurality of regions to create at least one more 360 degree two-dimensional panoramic image that corresponds to an outer side face of a different concentric polygon or concentric circle of said concentric polygons or concentric circles, and said perspective projection has not already been performed for the different concentric polygon or concentric circle;

overlaying said 360 degree two-dimensional panoramic images, information on a dynamic object residing in a region of an outer object within the smallest concentric polygon or concentric circles of said concentric polygons of concentric circles created by a three-dimensional object creation unit, and an image of said avatar; and storing said 360 degree two-dimensional panoramic images;

wherein said panoramic image creation unit adds, to one of said 360 degree two-dimensional panoramic images, action information that one of said static objects has, and wherein said client terminal displays said action information such that a user can select an action that enable interaction with one of said static objects;

wherein said panoramic image creation unit adds a Z value to one of said 360 degree two-dimensional panoramic images residing in a region of said three-dimensional object within the closest vicinity from said viewpoint to which one of said static objects is projected, wherein said Z value represents a position of the one of said static objects in a depth direction thereof.

* * * * *